United States Patent
Inazumi

(10) Patent No.: US 9,463,573 B2
(45) Date of Patent: Oct. 11, 2016

(54) ROBOT CONTROL SYSTEM, ROBOT SYSTEM, AND SENSOR INFORMATION PROCESSING APPARATUS

(71) Applicant: Seiko Epson Corporation, Tokyo (JP)

(72) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/590,032

(22) Filed: Jan. 6, 2015

(65) Prior Publication Data

US 2015/0112487 A1 Apr. 23, 2015

Related U.S. Application Data

(62) Division of application No. 13/669,824, filed on Nov. 6, 2012, now Pat. No. 8,958,914.

(30) Foreign Application Priority Data

Nov. 7, 2011 (JP) .................. 2011-243131

(51) Int. Cl.
*G05B 19/00* (2006.01)
*B25J 9/16* (2006.01)
*B25J 13/08* (2006.01)

(52) U.S. Cl.
CPC .............. *B25J 9/1694* (2013.01); *B25J 9/16* (2013.01); *B25J 9/1612* (2013.01); *B25J 9/1633* (2013.01);
(Continued)

(58) Field of Classification Search
CPC ........ B25J 9/1694; B25J 9/16; B25J 9/1612; B25J 9/1613; B25J 13/08
USPC .............................. 700/1, 248, 250, 252, 260
See application file for complete search history.

(56) References Cited

U.S. PATENT DOCUMENTS

| 5,144,549 A * | 9/1992 | Youcef-Toumi .... F16C 32/0444 700/262 |
| 5,157,315 A * | 10/1992 | Miyake .............. G05B 19/4086 318/568.11 |
| 5,329,442 A * | 7/1994 | Moshfegh .............. G05B 13/02 700/29 |

(Continued)

FOREIGN PATENT DOCUMENTS

| JP | 02-205489 | 8/1990 |
| JP | 04-141391 A | 5/1992 |

(Continued)

OTHER PUBLICATIONS

NPL: Introduction to Digital Filter Theory, JUlius Orion Smith III, Apr. 1985.*

(Continued)

*Primary Examiner* — Ian Jen
(74) *Attorney, Agent, or Firm* — Harness, Dickey & Pierce, P.L.C.

(57) ABSTRACT

A robot control system includes a force control unit configured to output a correction value of a target track of a robot on the basis of sensor information acquired from a force sensor, a target-value output unit configured to apply correction processing based on the correction value to the target track to calculate a target value and output the calculated target value, and a robot control unit configured to perform feedback control of the robot on the basis of the target value. The force control unit includes a digital filter unit. The force control unit applies digital filter processing by the digital filter unit to the sensor information to calculate a solution of an ordinary differential equation in force control and outputs the correction value on the basis of the calculated solution.

9 Claims, 21 Drawing Sheets

(52) U.S. Cl.
CPC ...... *B25J 13/08* (2013.01); *G05B 2219/39325* (2013.01); *G05B 2219/39343* (2013.01); *G05B 2219/39529* (2013.01); *G05B 2219/41166* (2013.01); *Y10S 901/09* (2013.01)

(56) References Cited

U.S. PATENT DOCUMENTS

| | | | | |
|---|---|---|---|---|
| 5,519,605 A * | 5/1996 | Cawlfield | ............ | G05B 13/048 700/31 |
| 5,550,953 A * | 8/1996 | Seraji | ............ | B25J 9/162 700/262 |
| 5,627,768 A * | 5/1997 | Uhlmann | ............ | G06F 17/18 702/109 |
| 5,777,872 A * | 7/1998 | He | ............ | G05B 11/32 700/129 |
| 5,867,631 A * | 2/1999 | Sato | ............ | B25J 9/1605 700/262 |
| 5,892,679 A * | 4/1999 | He | ............ | G05B 5/01 700/129 |
| 5,926,402 A * | 7/1999 | Tatsuta | ............ | G06F 17/5018 204/192.12 |
| 6,266,578 B1 * | 7/2001 | Udwadia | ............ | B25J 9/1633 318/568.12 |
| 6,945,306 B2 * | 9/2005 | Duncan | ............ | B05B 7/224 164/271 |
| 8,467,904 B2 * | 6/2013 | Dariush | ............ | B25J 9/1602 345/474 |
| 2004/0153173 A1 * | 8/2004 | Chang | ............ | G05B 13/024 700/37 |
| 2005/0080495 A1 * | 4/2005 | Tessier | ............ | B64C 13/04 700/63 |
| 2007/0073442 A1 * | 3/2007 | Aghili | ............ | B25J 9/1605 700/245 |
| 2011/0035576 A1 * | 2/2011 | Grittke | ............ | G01D 3/022 713/100 |
| 2011/0264420 A1 * | 10/2011 | Sander | ............ | G06F 19/12 703/2 |
| 2013/0116827 A1 * | 5/2013 | Inazumi | ............ | B25J 9/1612 700/260 |

FOREIGN PATENT DOCUMENTS

| | | |
|---|---|---|
| JP | 04-369004 B2 | 12/1992 |
| JP | 06-320451 | 11/1994 |
| JP | 10-000582 A | 1/1998 |
| JP | 2005-014192 A | 1/2005 |

OTHER PUBLICATIONS

NPL: Digital Filter; Date: N/A.*

* cited by examiner

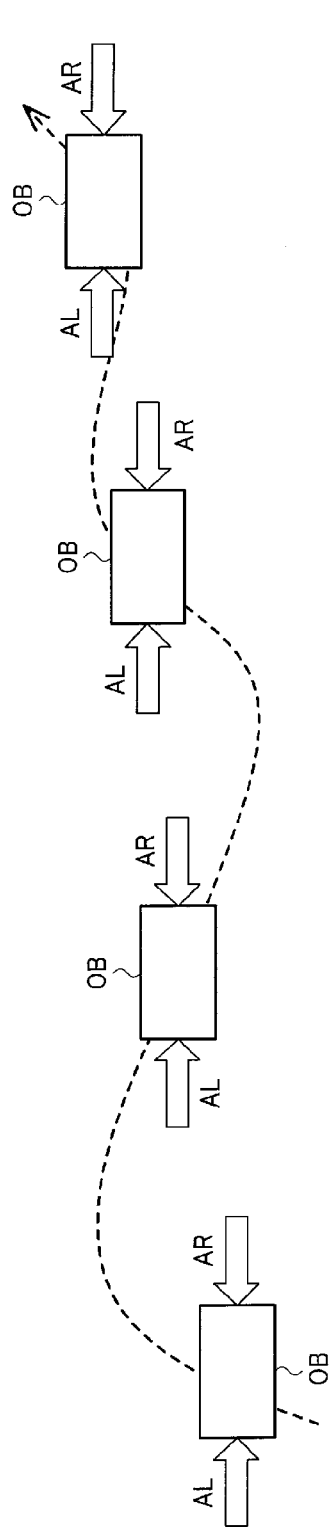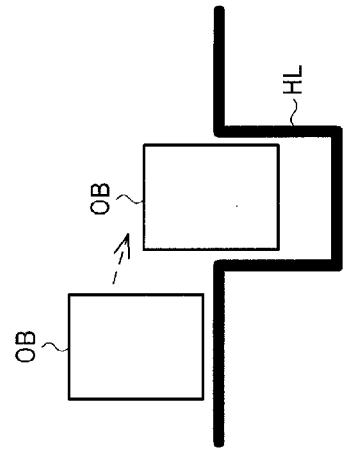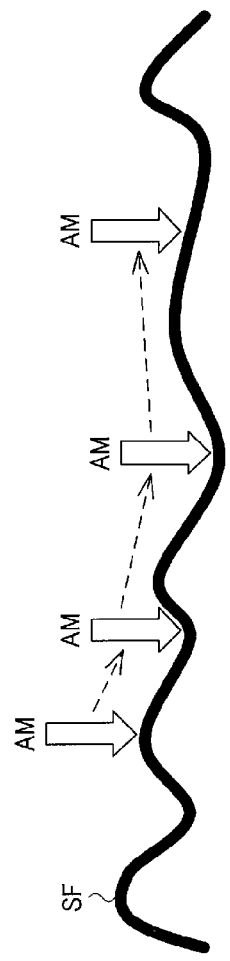
FIG. 3A
FIG. 3B
FIG. 3C

FIG. 4A
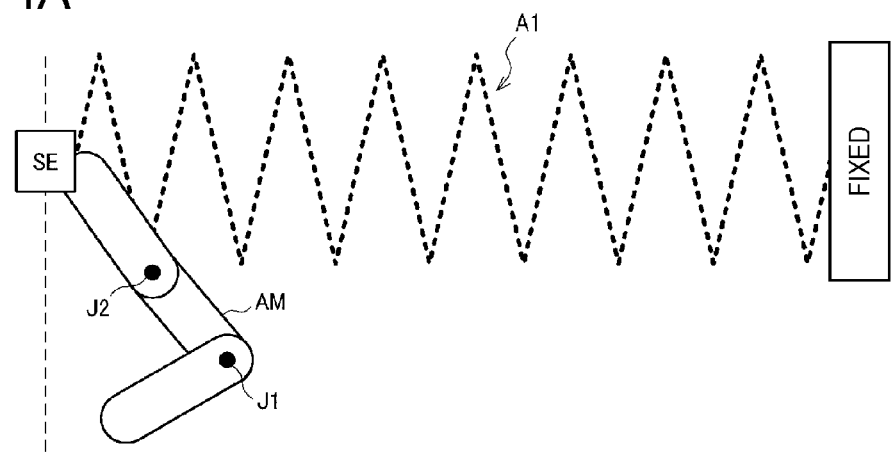
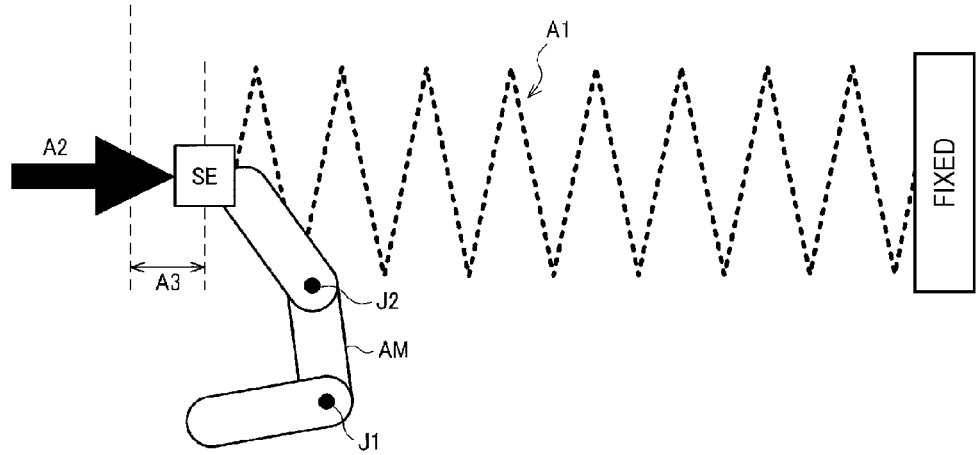
FIG. 4B

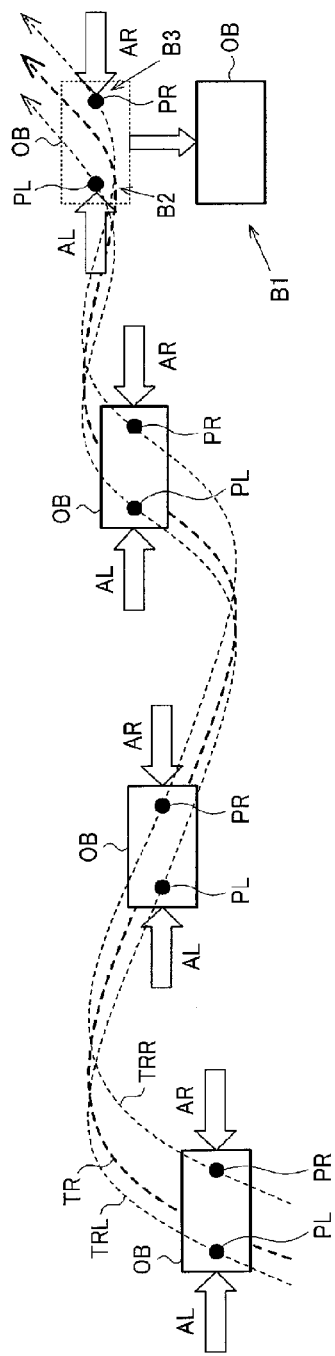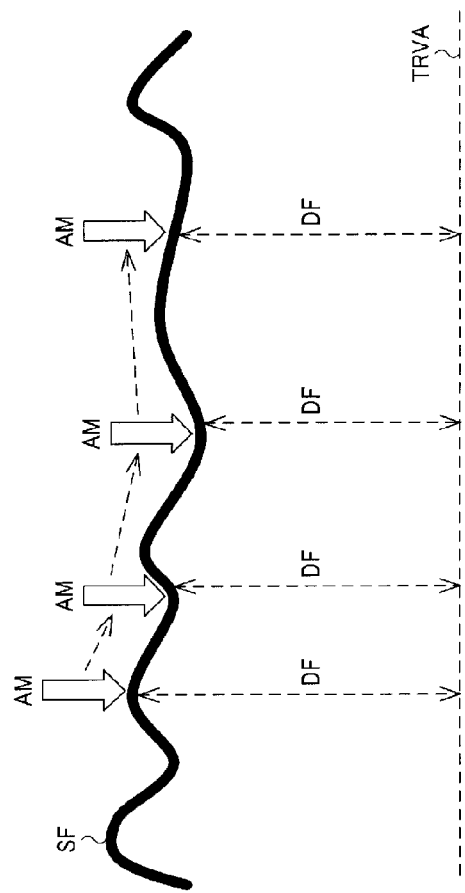
FIG. 5A
FIG. 5B $$Y_n = C_0 X_n + C_1 Y_{n-1} + C_2 Y_{n-2}$$

ROBOT CONTROL SYSTEM, ROBOT SYSTEM, AND SENSOR INFORMATION PROCESSING APPARATUS

CROSS-REFERENCE TO RELATED APPLICATIONS

This is a divisional patent application of U.S. application Ser. No. 13/669,824 filed Nov. 6, 2012, which claims priority to Japanese Patent Application No. 2011-243131 filed Nov. 7, 2011 all of which are incorporated by reference herein in their entireties.

BACKGROUND

1. Technical Field

The present invention relates to a robot control system, a robot system, a sensor information processing apparatus, and the like.

2. Related Art

As work performed using a robot such as a manipulator, there is work involving various constraint conditions such as contact with an object. In such a case, in addition to position control, force control is often required. For example, when the surface of an object is traced, when one object is fitted in another object, or when a soft object is gripped not to be broken, a motion corresponding to reaction from the object is necessary in addition to simple position control.

As a representative method for performing force control in a robot, there is a method called impedance control. The impedance control is a control method for causing a robot to act, irrespective of the actual mass, the viscosity characteristic, and the elasticity characteristic of the robot, as if the robot has values of the actual mass, the viscosity characteristic, and the elasticity characteristic suitable for work. This is a control method for solving an equation of motion on the basis of force information obtained from a force sensor or the like attached to the robot and causing the robot to act according to the solution. By appropriately setting the equation of motion, it is possible to cause the robot such as the manipulator to act as if the robot has predetermined mass, viscosity, and elasticity. As related arts concerning such impedance control and force control, techniques disclosed in JP-A-6-320451 (Patent Literature 1), JP-A-2-205489 (Patent Literature 2), and JP-A-4-369004 (Patent Literature 3) are known.

Patent Literature 1 discloses a method of accurately performing the impedance control even in an extremely complicated system, for example, when a control target is soft.

Patent Literature 2 discloses a method of providing a motion model on the inside of a control system to thereby, estimate force and performing the impedance control while making it unnecessary to use a sensor, although the control system is complicated, and using a simpler mechanical structure.

On the other hand, Patent Literature 3 discloses one method for reducing a calculation amount. This is a method of reducing a calculation amount by using a transpose Jacobian matrix without performing calculation for calculating an inverse Jacobian matrix described in Patent Literatures 1 and 2.

In the impedance control, in order to cause the robot or the like to behave as if the robot has desired characteristics (mass, viscosity characteristic, and elasticity characteristic), it is necessary to solve an ordinary differential equation (a motion equation serving as a secondary linear ordinary differential equation) in which coefficient parameters corresponding to the characteristics are used. Various methods of solving the ordinary differential equation are known. However, the Runge-Kutta method, the Newton method, or the like are used. However, these methods are not suitable for hardwaring. Determination of stability is difficult with these methods. Further, it is difficult to cope with switching of responsiveness. The responsiveness means a dynamic characteristic determined by the desired characteristics (mass, viscosity characteristic, and elasticity characteristic) given to the robot. Low responsiveness indicates, for example, characteristics realized by a large mass coefficient, a large viscosity coefficient, and a small elasticity coefficient. High responsiveness indicates, for example, characteristics realized by a small mass coefficient, a small viscosity coefficient, and a large elasticity coefficient. Optimum characteristics of these characteristics vary depending on realized work content or a scene of work. Therefore, it is an extremely important function to be capable of easily switching response characteristics.

SUMMARY

An advantage of some aspects of the invention is to provide a robot control system, a robot system, a sensor information processing apparatus, and the like that facilitate hardwaring, verification of stability, and switching of responsiveness of a solution.

An aspect of the invention relates to a robot control system including: a force control unit configured to output a correction value of a target track of a robot on the basis of sensor information acquired from a force sensor; a target-value output unit configured to apply correction processing based on the correction value to the target track to calculate a target value and output the calculated target value; and a robot control unit configured to perform feedback control of the robot on the basis of the target value. The force control unit includes a digital filter unit. The force control unit applies digital filter processing by the digital filter unit to the sensor information to calculate a solution of an ordinary differential equation in force control and outputs the correction value on the basis of the calculated solution.

In the aspect of the invention, the robot control system performs the force control on the basis of the sensor information acquired from the force sensor to calculate the correction value and performs the feedback control of the robot using the target value obtained on the basis of the correction value. In the force control, processing for calculating the solution of the ordinary differential equation is performed by the digital filter processing to output the correction value. Consequently, it is possible to, for example, facilitate hardwaring, determination of stability, and switching of responsiveness of the processing. In one aspect of the invention, the digital filter unit includes: a digital-filter-coefficient output unit configured to output a digital filter coefficient on the basis of coefficient parameters of respective terms of the ordinary differential equation; and a digital filter arithmetic unit configured to perform the digital filter processing on the basis of the digital filter coefficient and the sensor information.

Consequently, it is possible to, for example, perform the digital filter processing while causing the coefficient parameters of the terms of the ordinary differential equation to correspond to the digital filter coefficient.

In one aspect of the invention, the digital-filter-coefficient output unit includes: a digital-filter-coefficient converting unit configured to perform processing for converting the coefficient parameters into the digital filter coefficient; and a digital-filter-coefficient storing unit configured to store the digital filter coefficient converted by the digital-filter-coefficient converting unit. The digital-filter-coefficient output unit outputs the digital filter coefficient stored in the digital-filter-coefficient storing unit.

Consequently, it is possible to convert the coefficient parameters of the terms of the ordinary differential equation into the digital filter coefficient.

In one aspect of the invention, the digital-filter unit includes a digital-filter-stability-degree determining unit configured to determine a stability degree of the operation of a digital filter used for the digital filter processing. The digital-filter-coefficient output unit outputs the digital filter coefficient when the digital-filter-stability-degree determining unit determines that the operation of the digital filter is stable.

Consequently, it is possible to, for example, determine stability of a system concerning the ordinary differential equation by performing the determination of the stability of the digital filter processing.

In one aspect of the invention, when the digital filter processing is performed at a driving frequency of any one of a first driving frequency or a second driving frequency higher than the first driving frequency, the digital-filter-coefficient output unit outputs at least one of a first digital filter coefficient corresponding to the first driving frequency and a second digital filter coefficient corresponding to the second driving frequency. The digital filter arithmetic unit performs, according to the digital filter coefficient output from the digital-filter-coefficient output unit, at least one of the digital filter processing by the first driving frequency in which the first digital filter coefficient is used and the digital filter processing by the second driving frequency in which the second digital filter coefficient is used.

Consequently, it is possible to, for example, switch the driving frequency of the digital filter processing. It is possible to change the responsiveness of the solution by switching the driving frequency. Further, it is possible to, for example, cope with a change in a response characteristic by band limiting processing or the like for noise reduction.

In one aspect of the invention, the digital filter unit includes a selection processing unit configured to select one of the first driving frequency and the second driving frequency on the basis of signal frequency band information of the sensor information. The digital filter unit performs the digital filter processing at the driving frequency selected by the selection processing unit and outputs the correction value.

Consequently, it is possible to, for example, automatically select the driving frequency on the basis of the signal frequency band information of the sensor information.

In one aspect of the invention, the selection processing unit selects the driving frequency using, as the signal frequency band information, low-frequency sensor information obtained by applying low-pass filter processing to the sensor information and high-frequency sensor information obtained by applying high-pass filter processing to the sensor information.

Consequently, it is possible to use the low-frequency sensor information and the high-frequency sensor information as the signal frequency band information.

In one aspect of the invention, when the driving frequency of the digital filter processing is switched from the high second driving frequency to the low first driving frequency, the digital filter arithmetic unit performs, in a first period, the digital filter processing by the second driving frequency in which the second filter coefficient is used, performs, in a switching period following the first period, both of the digital filter processing by the first driving frequency in which the first filter coefficient is used and the digital filter processing by the second driving frequency in which the second filter coefficient is used, and performs, in a second period following the switching period, the digital filter processing by the first driving frequency in which the first filter coefficient is used. Consequently, it is possible to, for example, smoothly perform switching of the driving frequency from a high frequency to a low frequency.

In one aspect of the invention, when the driving frequency of the digital filter processing is switched from the low first driving frequency to the high second driving frequency, the digital filter arithmetic unit performs, on the basis of a first output value, which is an output value of the digital filter processing by the first driving frequency in which the first filter coefficient is used at switching timing, and a second output value, which is an output value of the digital filter processing by the first driving frequency in which the first filter coefficient is used at timing in the past earlier than the switching timing, interpolation processing for calculating an interpolation value at timing between the switching timing and the timing in the past and performs, on the basis of the interpolation value, the digital filter processing by the second driving frequency in which the second filter coefficient is used. Consequently, it is possible to, for example, smoothly perform switching of the driving frequency from a low frequency to a high frequency.

In one aspect of the invention, the digital filter unit includes a first digital filter arithmetic unit and a second digital filter arithmetic unit as the digital filter arithmetic unit. The digital-filter-coefficient output unit outputs a first digital filter coefficient to the first digital filter arithmetic unit and outputs a second digital filter coefficient different from the first digital filter coefficient to the second digital filter arithmetic unit. The first digital filter arithmetic unit performs the digital filter processing based on the first digital filter coefficient and the sensor information. The second digital filter arithmetic unit performs the digital filter processing based on the second digital filter coefficient and the sensor information.

Consequently, it is possible to operate a plurality of the digital filter units in parallel, and whereby, for example, the response characteristic can be switched smoothly.

In one aspect of the invention, the digital filter unit includes a digital-filter-output selecting unit configured to select any one of a processing result in the first digital filter arithmetic unit and a processing result in the second digital filter arithmetic unit and outputs the processing result as the correction value.

Consequently, it is possible to select an appropriate output value even if a plurality of kinds of digital filter processing are caused to operate in parallel.

In one aspect of the invention, when the digital filter processing is performed at a driving frequency of any one of a first driving frequency or a second driving frequency higher than the first driving frequency, the digital-filter-coefficient output unit outputs a digital filter coefficient corresponding to the first driving frequency as the first digital filter coefficient and outputs a digital filter coefficient corresponding to the second driving frequency as the second digital filter coefficient. The first digital filter arithmetic unit performs the digital filter processing at the first driving frequency on the basis of the first digital filter coefficient. The second digital filter arithmetic unit performs the digital filter processing at the second driving frequency on the basis of the second digital filter coefficient. Consequently, it is possible to, for example, switch the driving frequency of the digital filter processing.

In one aspect of the invention, the force control unit includes a band limiting unit configured to apply band limiting processing for allowing a given frequency band to pass to the sensor information and output the sensor information subjected to the band limiting processing to the first digital filter arithmetic unit and the second digital filter arithmetic unit. The band limiting unit outputs, to the first digital filter arithmetic unit, the sensor information subjected to band limiting processing for allowing a first frequency band to pass and outputs, to the second digital filter arithmetic unit, the sensor information subjected to band limiting processing for allowing a second frequency band wider than the first frequency band to pass.

Consequently, it is possible to apply the band limiting processing to the sensor information to correspond to the driving frequency.

In one aspect of the invention, the digital-filter-coefficient output unit includes a coefficient selecting unit configured to select any one of a first digital filter coefficient and a second filter coefficient different from the first digital filter coefficient. The digital-filter-coefficient output unit outputs the digital filter coefficient selected by the coefficient selecting unit to the digital filter arithmetic unit.

Consequently, it is possible to select one of a plurality of digital filter coefficients. It is possible to, for example, smoothly switch the digital filter processing.

In one aspect of the invention, when the digital filter processing is performed at a driving frequency of any one of a first driving frequency or a second driving frequency higher than the first driving frequency, the coefficient selecting unit selects any one of the first digital filter coefficient corresponding to the first driving frequency and the second digital filter coefficient corresponding to the second driving frequency. The digital-filter-coefficient output unit outputs the digital filter coefficient selected by the coefficient selecting unit to the digital filter arithmetic unit. The digital filter arithmetic unit performs, when the first digital filter coefficient is output from the digital-filter-coefficient output unit, the digital filter processing at the first driving frequency on the basis of the first digital filter coefficient and performs, when the second digital filter coefficient is output from the digital-filter-coefficient output unit, the digital filter processing at the second driving frequency on the basis of the second digital filter coefficient.

Consequently, it is possible to, for example, switch the driving frequency of the digital filter processing.

In one aspect of the invention, the force control unit includes a band limiting unit configured to apply band limiting processing for allowing a given frequency band to pass to the sensor information and output the sensor information subjected to the band limiting processing to the digital filter arithmetic unit. The band limiting unit outputs, when the digital filter processing by the first driving frequency is performed, to the digital filter arithmetic unit, the sensor information subjected to band limiting processing for allowing a first frequency band to pass and outputs, when the digital filter processing by the second driving frequency is performed, to the digital filter arithmetic unit, the sensor information subjected to band limiting processing for allowing a second frequency band wider than the first frequency band to pass.

Consequently, it is possible to apply the band limiting processing to the sensor information to correspond to the driving frequency.

In one aspect of the invention, the ordinary differential equation is an equation of motion including an imaginary mass term, an imaginary viscosity term, and an imaginary elasticity term as coefficient parameters.

Consequently, it is possible to output the correction value by solving the equation of motion as the ordinary differential equation.

In one aspect of the invention, the target-value output unit includes: a track generating unit configured to output target position information of the robot; and an inverse kinematics processing unit configured to perform inverse kinematics processing on the basis of the target position information from the track generating unit and output joint angle information of the robot.

Consequently, it is possible to calculate the target position information, convert the target position information into the joint angle information, and calculate the target value of the feedback control of the robot on the basis of the converted joint angle information.

In one aspect of the invention, the force control unit applies the digital filter processing by the digital filter unit to the sensor information to calculate a solution of the ordinary differential equation in the force control and outputs the calculated solution as the correction value.

Consequently, it is possible to directly output the solution of the ordinary differential equation as the correction value.

In one aspect of the invention, the force control unit applies the digital filter processing by the digital filter unit to the sensor information to calculate a solution of the ordinary differential equation in the force control, applies inverse kinematics processing to the calculated solution, and outputs the correction value.

Consequently, it is possible to calculate the correction value by applying the inverse kinematics processing to the solution of the ordinary differential equation and output the calculated correction value.

Another aspect of the invention relates to a robot system including the robot control system described above and a robot. Still another aspect of the invention relates to a sensor information processing apparatus including: a sensor-information acquiring unit configured to acquire sensor information from a sensor; and a sensor-information processing unit configured to apply processing to the acquired sensor information. The sensor-information processing unit includes a digital filter unit. The sensor-information processing unit applies digital filter processing by the digital filter unit to the sensor information to calculate a solution of an ordinary differential equation in the sensor information processing and outputs the solution as an output value of the sensor information processing.

BRIEF DESCRIPTION OF THE DRAWINGS

The invention will be described with reference to the accompanying drawings, wherein like numbers reference like elements.

FIGS. 3A to 3C are explanatory diagram concerning force control.

FIGS. 4A and 4B are explanatory diagrams concerning compliance control.

FIGS. 5A and 5B are explanatory diagrams concerning impedance control.

DESCRIPTION OF EXEMPLARY EMBODIMENTS

Embodiments are explained below. The embodiments explained below do not unduly limit contents of the invention described in the appended claims. All components explained in the embodiments are not always indispensable constituent features of the invention.

1. Overview 1.1 Basic Configuration

Figure 1:
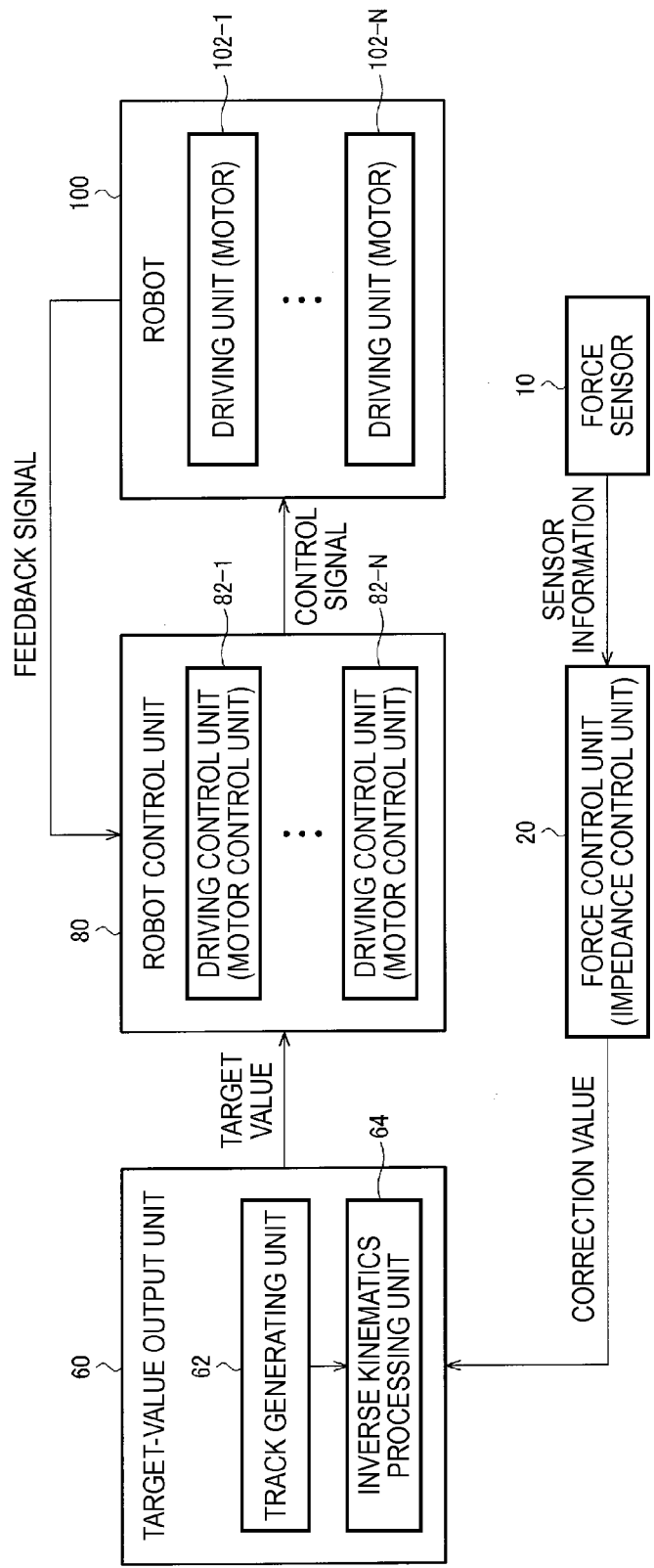
FIG. 1 is a basic configuration example of a robot control system and a robot system.

A configuration example of a robot control system (a manipulator control system) and a robot system including the robot control system according to an embodiment is shown in FIG. 1. The robot control system and the robot system according to this embodiment are not limited to the configuration shown in FIG. 1. Various modifications are possible, for example, a part of components of the robot control system and the robot system are omitted and other components are added.

The robot control system according to this embodiment includes a force control unit 20, a target-value output unit 60, and a robot control unit 80. The robot system according to this embodiment includes the robot control system and a robot 100 (a force sensor 10).

The target-value output section 60 outputs a target value of feedback control of a robot (in a narrow sense, a manipulator). Feedback control of the robot 100 is realized on the basis of the target value. For example, in a multi-joint robot or the like, the target value is joint angle information of the robot. The joint angle information of the robot is, for example, information indicating angles of joints (angles formed by joint axes) in a link mechanism of an arm of the robot.

The target-value output unit 60 can include a track generating unit 62 and an inverse kinematics processing unit 64. The track generating unit 62 outputs track information of the robot. The track information can include position information (x, y, z) of an end effecter section (an end point) of the robot and rotation angle information (u, v, w) around coordinate axes. The inverse kinematics processing unit 64 performs inverse kinematics processing on the basis of the track information from the track generating unit 62 and outputs, for example, the joint angle information of the robot as the target value. The inverse kinematics processing is processing for calculating a motion of the robot including joints and is processing for calculating, according to the inverse kinematics, joint angle information and the like from position posture and the like of the end effecter section of the robot.

The force control unit 20 (in a narrow sense, an impedance control unit) performs force control (force sense control) on the basis of sensor information acquired from the force sensor 10 and outputs a correction value of the target value. More specifically, the force control unit 20 (the impedance control unit) performs impedance control (or compliance control) on the basis of sensor information (force information and moment information) from the force sensor 10. The force control is, for example, control in which feedback of force is added to the position control in the past. The impedance control is a method of changing easiness of occurrence of displacement (mechanical impedance) of the end effecter section (the fingers) with respect to external force to a desirable state through control. Specifically, the impedance control is control for, in a model in which mass, a viscosity coefficient, and an elasticity coefficient are connected to the end effecter section of the robot, bringing the robot into contact with an object with mass, a viscosity coefficient, and an elasticity coefficient set as targets. The force sensor 10 is a sensor that detects force and moment received as reaction of force generated by the robot 100. The force sensor 10 is usually attached to a wrist portion of an arm of the robot 100. The detected force and moment are used for various kinds of force control (impedance control) as sensor information.

Figure 2:
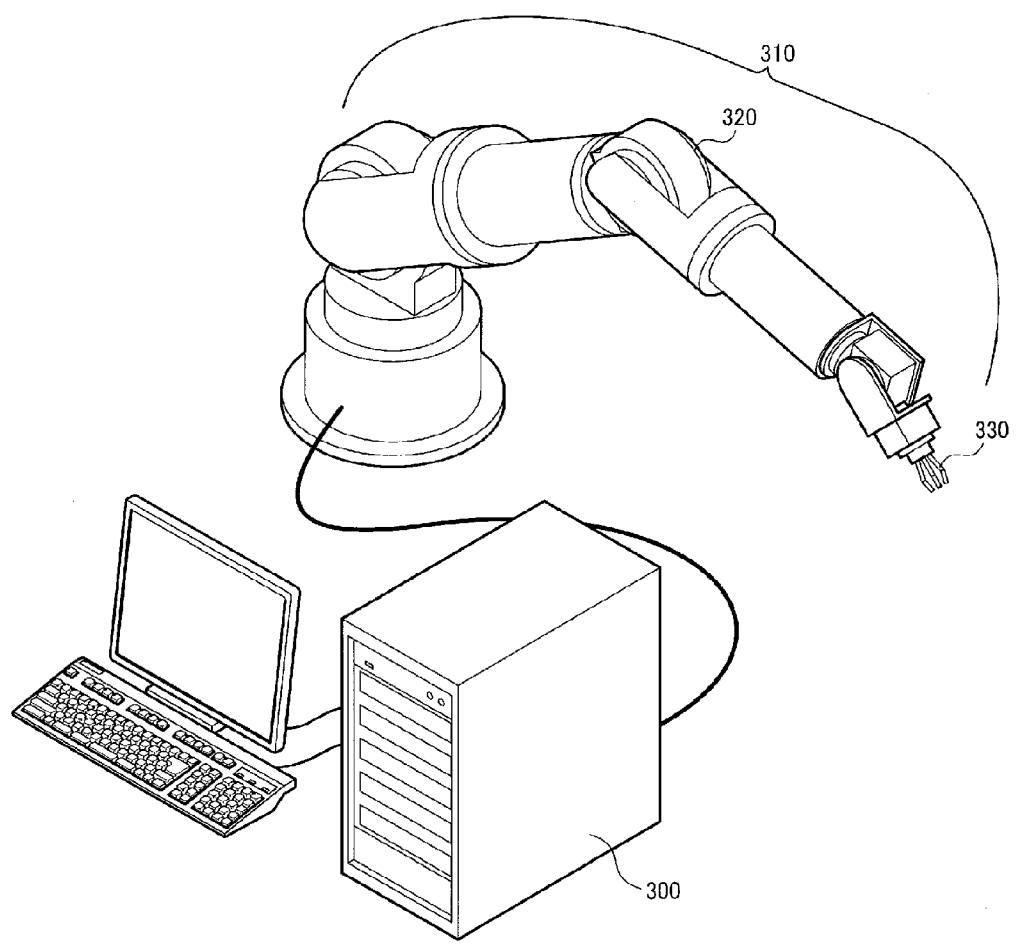
FIG. 2 is an example of the robot system.

The robot control unit 80 performs the feedback control of the robot on the basis of the target value from the target-value output unit 60. Specifically, the robot control unit 80 performs the feedback control of the robot on the basis of the target value output as a result of the correction processing based on the correction value from the force control unit 20. For example, the robot control unit 80 performs the feedback control of the robot 100 on the basis of the target value and a feedback signal from the robot 100. For example, the robot control unit 80 includes a plurality of driving control units 82-1 to 82-N (in a narrow sense, motor control units). The robot control unit 80 outputs a control signal to driving units 102-1 to 102-N. The driving units 102-1 to 102-N are driving mechanisms for moving joints of the robot 100 and are realized by, for example, motors. An example of the robot system including the robot control system according to this embodiment is shown in FIG. 2. The robot system includes a control apparatus 300 (an information processing apparatus) and a robot 310 (the robot 100 shown in FIG. 1). The control apparatus 300 performs control processing for the robot 310. Specifically, the control apparatus 300 performs, on the basis of operation sequence information (scenario information), control for causing the robot 310 to operate. The robot 310 includes an arm 320 and a hand (a gripping unit) 330. The robot 310 operates according to an operation instruction from the control apparatus 300. For example, the robot 310 performs operation for gripping or moving a work placed on a not-shown pallet. Information such as the posture of the robot and the position of the work is detected on the basis of picked-up image information acquired by a not shown image-pickup apparatus. The detected information is sent to the control apparatus 300. The root control system according to this embodiment is provided in, for example, the control apparatus 300 shown in FIG. 2. For example, the robot control system is realized by hardware and a computer program of the control apparatus 300. With the robot control system according to this embodiment, it is possible to reduce a performance request to control hardware of the control apparatus 300 and the like. Further, it is possible to cause the robot 310 to operate at high responsiveness. FIG. 2 is an example of a single arm type. However, the robot 310 may be a robot of a multi-arm type such as a double arm type.

1.2 Force Control and Impedance Control

An overview of the force control and the impedance control (the compliance control) is explained.

FIG. 3A shows a state in which a robot is moving while holding an object OB with a left arm AL and a right arm AR. For example, only with position control, it is likely that the object is dropped or broken. With the force control, it is possible to hold and move a soft object or a fragile object from both sides with appropriate force as shown in FIG. 3A.

With the force control, as shown in FIG. 3B, it is possible to trace, with an arm AM or the like, a surface SF of an object having uncertainty. Such control cannot be realized by only the position control. With the force control, as shown in FIG. 3C, it is also possible to, after rough positioning, search and align the object OB to fit the object OB in a hole section HL. However, in the force control by an actual mechanical component such as a spring, uses of the force control is limited. Further, in such force control by the mechanical component, it is difficult to switch dynamic switching of a characteristic. On the other hand, torque control for controlling the torque of a motor is easy. However, positional accuracy is deteriorated. Further, collision or the like occurs when there is abnormality. For example, in FIG. 3A, when an abnormal situation occurs and the object OB is dropped, in the torque control, since reaction to be balanced is lost, for example, the left and right arms AL and AR collide with each other.

On the other hand, the impedance control (the compliance control) has an advantage that universality and safety are high, although there is a disadvantage that control is complicated.

FIGS. 4A and 4B are diagrams for explaining the compliance control, which is a type of the impedance control. Compliance means a reciprocal of a spring constant. Whereas the spring constant represents hardness, the compliance means softness. When an interaction acts between the robot and the environment, control for imparting the compliance, which is mechanical flexibility, is referred to as compliance control.

For example, in FIG. 4A, a force sensor SE is attached to the arm AM of the robot. The arm AM of the robot is programmed to change posture according to sensor information (force and torque information) obtained by the force sensor SE. Specifically, the robot is controlled as if an imaginary spring indicated by A1 in FIG. 4A is attached to the distal end of the arm AM.

For example, it is assumed that a spring constant of the spring indicated by A1 is 100 Kg/m. If the spring is pushed with force of 5 Kg as indicated by A2 in FIG. 4B, the spring contracts by 5 cm as indicated by A3. In other words, if the spring is contracted by 5 cm, the spring is considered to be pushed with force of 5 Kg. This means that force information and position information are associated with each other.

In the compliance control, control is performed as if the imaginary spring indicated by A1 is attached to the distal end of the arm AM. Specifically, the robot operates in response to an input of the force sensor SE. The robot is controlled to retract by 5 cm as indicated by A3 with respect to weighting of 5 Kg indicated by A2 and is controlled such that the position information changes to correspond to the force information. The simple compliance control explained above does not include a time term. Control including a time term and taking into account terms up to a secondary term of the time term is the impedance control. Specifically, the secondary term is a mass term and a primary term is a viscosity term. A model of the impedance control can be represented by an equation of motion indicated by Formula (1) below.

$$f(t)=m\ddot{x}+\mu\dot{x}+kx \quad (1)$$

In Formula (1), m represents mass, μ represents a viscosity coefficient, k represents an elasticity coefficient, f represents force, and x represents displacement from a target position. Primary differential and secondary differential of x respectively correspond to speed and acceleration. In the impedance control, a control system for imparting the characteristic of Formula (1) to an end effecter section, which is the distal end of the arm, is configured. In other words, control is performed as if the distal end of the arm has imaginary mass, an imaginary viscosity coefficient, and an imaginary elasticity coefficient represented by Formula (1).

As explained above, the impedance control is control for bringing the robot into contact with an object with a viscosity coefficient and an elasticity coefficient set as targets in a model in which a viscosity element and an elasticity element are connected to the mass of the distal end of the arm in respective directions.

For example, as shown in FIG. 5A, control for gripping the object OB with the arms AL and AR of the robot and moving the object OB along a track TR is considered. In this case, a track TRL is a track on which a point PL set on the inner side of the left side of the object OB passes and is a track of an imaginary left hand determined assuming the impedance control. A track TRR is a track on which a point PR set on the inner side of the right side of the object OB passes and is a track of an imaginary right hand determined assuming the impedance control. In this case, the arm AL is controlled such that force corresponding to a distance difference between the distal end of the arm AL and the point PL is generated. The arm AR is controlled such that force corresponding to a distance difference between the distal end of the arm AR and the point PR is generated. Consequently, it is possible to realize the impedance control for moving the object OB while softly gripping the object OB. In the impedance control, even if a situation occurs in which the object OB drops as indicated by B1 in FIG. 5A, the arms AL and AR are controlled such that the distal ends thereof stop in the positions of the points PL and PR as indicated by B2 and B3. Unless an imaginary track is a collision track, it is possible to prevent the arms AL and AR from colliding with each other.

As shown in FIG. 5B, when the arm AM is controlled to trace the surface SF of the object, in the impedance control, the arm AM is controlled such that force corresponding to a distance difference DF between an imaginary track TRVA and the distal end of the arm AM acts on the distal end of the arm AM. Therefore, it is possible to control the arm AM to trace the surface SF while applying force to the arm AM.

1.3 Configuration of the Control System

Figure 6:
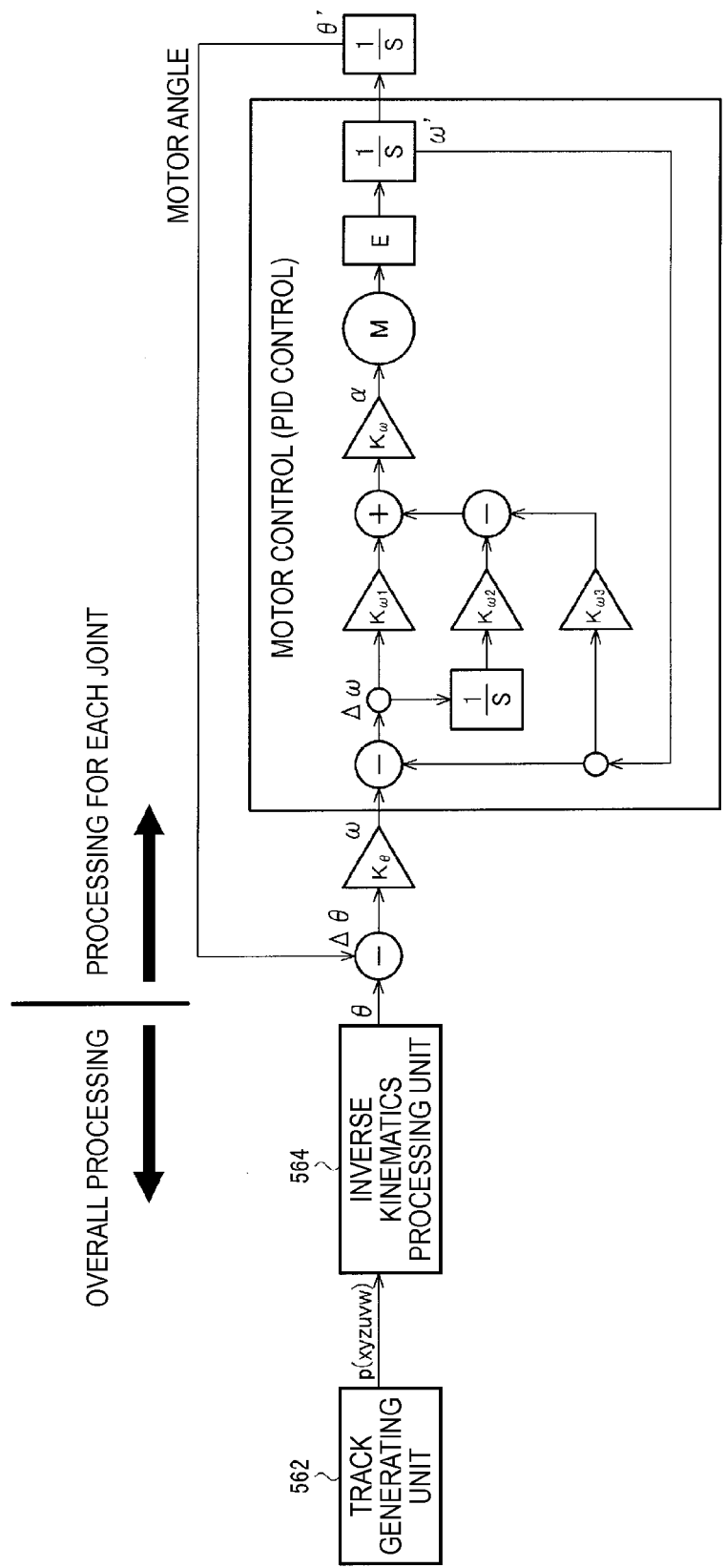
FIG. 6 is a basic configuration example of a control system not including force sense feedback.

A basic configuration example of the control system not including the force sense feedback is shown in FIG. 6.

A track generating unit 562 generates track information p (xyzuvw) and outputs the track information p to an inverse kinematics processing unit 564. The track information p includes, for example, position information (xyz) of the distal end (the end effecter section) of the arm and rotation information (uvw) around axes. The inverse kinematics processing unit 564 performs inverse kinematics processing on the basis of the track information p and generates and outputs a joint angle θ of joints, which is a target value. Motor control is performed on the basis of the joint angle θ, whereby operation control of the arm of the robot is performed. In this case, control of a motor (M) shown in FIG. 6 is realized by publicly-known PID control. Since the PID control is a publicly-known technique, detailed explanation of the PID control is omitted.

In FIG. 6, a target-value output unit is configured by the track generating unit 562 and the inverse kinematics processing unit 564. Processing by the target-value output unit is overall processing for the robot. On the other hand, motor control at a post stage is control for each joint.

Figure 7:
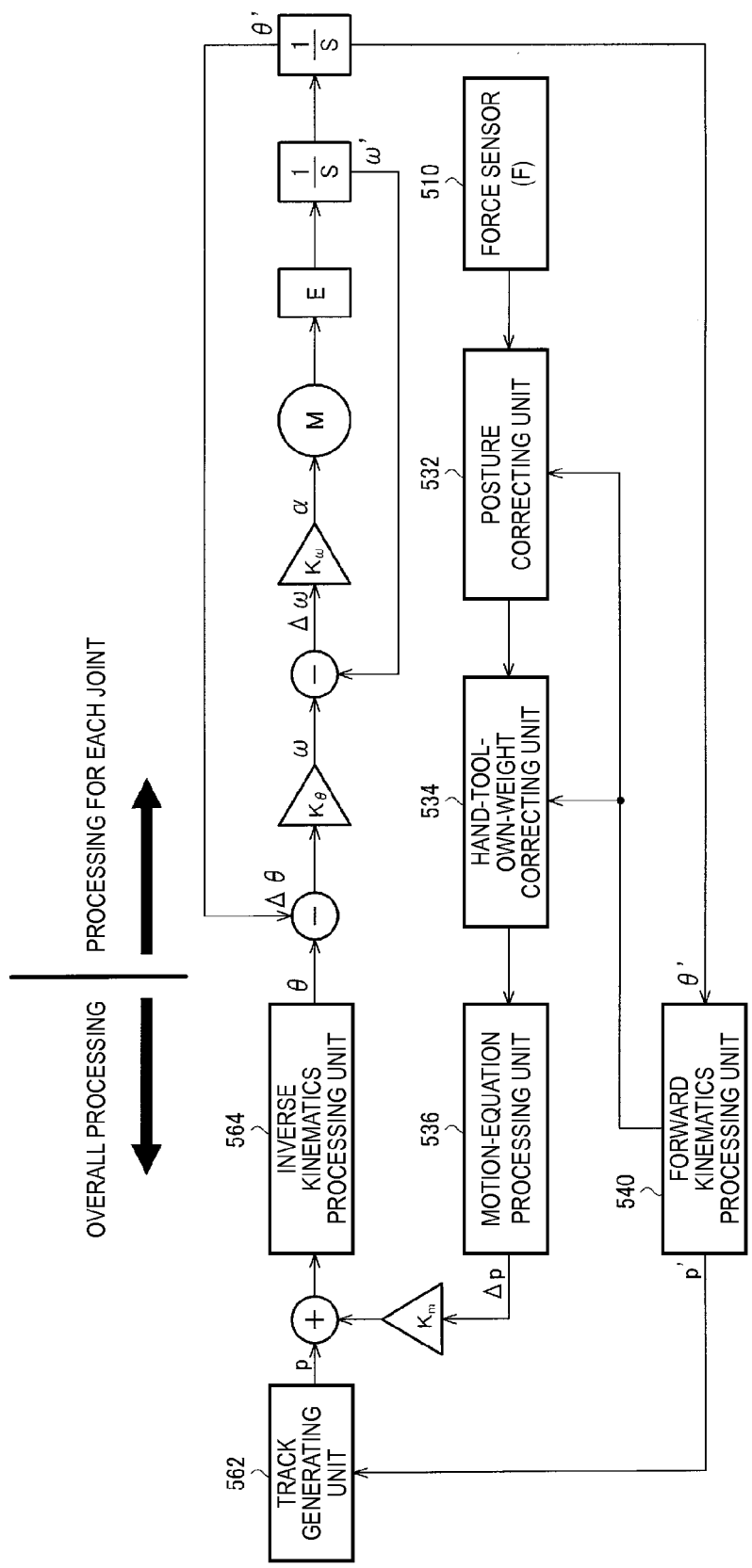
FIG. 7 is a basic configuration example of the control system including the force sense feedback.

A basic configuration example of the control system including the force sense feedback is shown in FIG. 7. In FIG. 7, a force sensor 510, a posture correcting unit 532, a hand-tool-own-weight correcting unit 534, a motion-equation processing unit 536, and a forward kinematics processing unit 540 are added to the configuration shown in FIG. 6.

In FIG. 7, receiving sensor information from the force sensor 510, the posture correcting unit 532 performs posture correction for the sensor and the hand-tool-own-weight correcting unit 534 performs hand tool own weight correction. The motion-equation processing unit 536 performs processing for calculating a solution of the equation of motion indicated by Formula (1) and outputs a correction value Δp. The track information p is corrected by the correction value Δp, whereby correction processing for the joint angle θ, which is the target value, is performed. The forward kinematics processing unit 540 performs forward kinematics processing to calculate track information p' of the robot and feeds back the track information p' to the track generating unit 562. The posture correcting unit 532 outputs information for specifying posture to the hand-tool-own-weight correcting unit 534. The feedback of the track information p' of the robot to the track generating unit 562 is feedback for performing, for example, correction processing for a track based on p'. If the correction processing or the like is not performed, the feedback is not always necessary.

The hand-tool-own-weight correcting unit 534 performs hand tool own weight correction. The posture correcting unit 532 performs posture correction. The hand tool own weight correction is correction processing for eliminating the influence due to the own weight of the hand of the robot and the own weight of a tool gripped by the hand from sensor information (force information) acquired from the force sensor 10. The posture correction is correction processing for eliminating the influence due to the posture of the force sensor 10 from the sensor information (the force information). The hand tool own weight correction and the posture correction can be represented, for example, as indicated by Formula (2) below.

$$\begin{pmatrix} fx \\ fy \\ fz \\ fu \\ fv \\ fw \\ 1.0 \end{pmatrix} = \begin{bmatrix} Mxx & Mxy & Mxz & Mxu & Mxv & Mxw & Bx \\ Myx & \ddots & & & & Myw & By \\ Mzx & & & & & Mzw & Bz \\ Mux & & & & & Muw & Bu \\ Mvx & \ddots & & & \ddots & Mvw & Bv \\ Mwx & Mwy & Mwz & Mwu & Mwv & Mww & Bw \\ 0.0 & 0.0 & 0.0 & 0.0 & 0.0 & 0.0 & 1.0 \end{bmatrix} \begin{pmatrix} Fx \\ Fy \\ Fz \\ Fu \\ Fv \\ Fw \\ 1.0 \end{pmatrix} \quad (2)$$

In Formula (2), Fx, Fy, Fz, Fu, Fv, and Fw represent force information and torque information, which are sensor information, acquired from the force sensor 10. Bx, By, Bz, Bu, By, and Bw represent bias terms. Sensor information (force information and torque information) after correction fx, fy, fz, fu, fv, and fw are input to the motion-equation processing unit 536. Since fixed values are included in data, a substantial number of correction coefficients are 6×7=42. Since the hand tool own weight correction and the posture correction are publicly-known correction processing, detailed explanation thereof is omitted.

1.4 Digital Filter Processing

The motion-equation processing unit 536 shown in FIG. 7 needs to calculate a solution of an equation of motion (in a broad sense, an ordinary differential equation). In the past, the Newton method, the Runge-Kutta method, or the like is used to calculate a solution of the equation of motion. However, these methods are not suitable for hardwaring. Determination of stability is difficult with these methods. Further, it is difficult to cope with switching of responsiveness.

Therefore, to solve the three problems, the applicant uses a digital filter as a method of solving the ordinary differential equation.

1.4.1 Method of Solving the Equation of Motion Using a Digital Filter

The equation of motion is represented in the form of Formula (1). Since the equation of motion is a linear ordinary differential equation, if an impulse response, which is a solution to an impulse input, is calculated, it is possible to obtain a solution to an arbitrary external force term according to convolution of the impulse response and an external force term.

If a step of calculating a solution of the equation of motion is regarded as a filter for outputting a solution (e.g., position information) with respect to an input of sensor information of the force sensor, the step can be considered a two-pole analog filter from the form of Formula (1).

In other words, a solution of the equation of motion can be calculated as an output of the analog filter. Therefore, it is possible to solve the equation of motion using the digital filter by converting the analog filter into a digital filter. Various method of converting the analog filter into a digital filter are known. For example, the Impulse Invariance method only has to be used. This is a method of considering a digital filter that gives an impulse response same as a value obtained by sampling an impulse response of the analog filter at a discrete time T. Since the Impulse Invariance method is a publicly-known method, detailed explanation of the impulse Invariance method is omitted.

Figure 8:
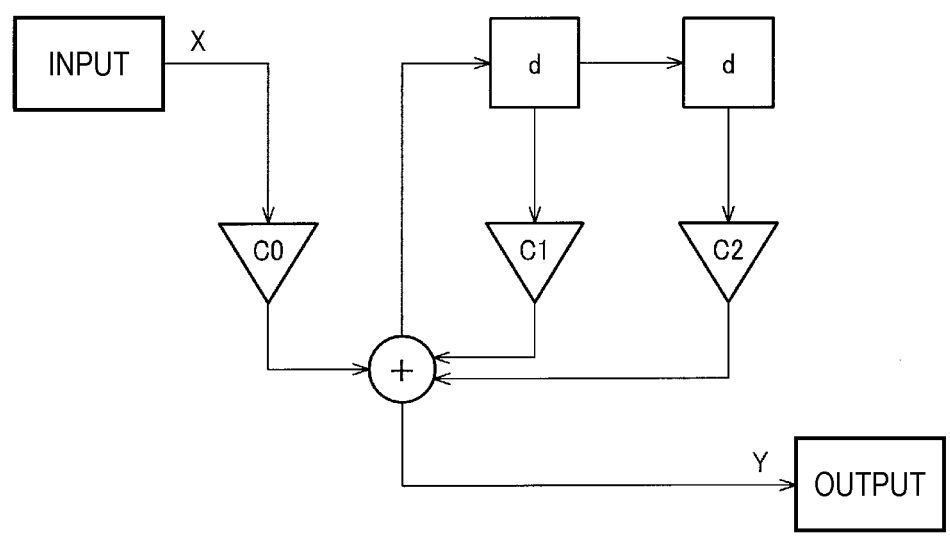
FIG. 8 is a basic form of a digital filter in calculating a solution of an equation of motion.

As a result, it is possible to calculate a solution of the ordinary differential equation as an output of the digital filter. The equation of motion is a two-pole digital filter as shown in FIG. 8. In FIG. 8, d represents a delay of one sample and C0, C1, and C2 represent coefficients of the filter.

In processing by the digital filter, hardwaring is easy and determination of stability is also easy as explained below. If a coefficient of the digital filter is switched, it is also possible to switch a characteristic (e.g., whether the digital filter is moved softly or hardly) and switch a filter driving frequency to switch responsiveness of a solution.

1.4.2 Stability Determination of the Digital Filter

In the impedance control, it is likely that an unstable system is formed depending on setting of the mass term (m), the viscosity term (μ), and the elasticity term (k) of the equation of motion. In an extreme example, an oscillating system in which, if force is applied to the robot once, oscillation of the robot continues even if the robot is not touched at all thereafter could be formed. Such a system with low stability (a low degree of stability) is undesirable in practice. Therefore, it is necessary to determine stability of a system concerning the equation of motion and take some measures if the system is unstable.

However, in the Newton method and the Runge-Kutta method, although a solution of the equation of motion can be calculated, determination of stability cannot be performed. Therefore, processing for determining stability is necessary separately from the processing for calculating a solution. However, in general, it is known that determination processing for stability is not easy.

In the method according to this embodiment, the equation of motion is processed using the digital filter. Therefore, determination of stability of a system concerning the equation of motion is nothing but determination of stability of the digital filter corresponding to the system. The determination of stability of the digital filter can be easily performed. It only has to be determined whether poles are present in a unit circle.

Figure 9A:
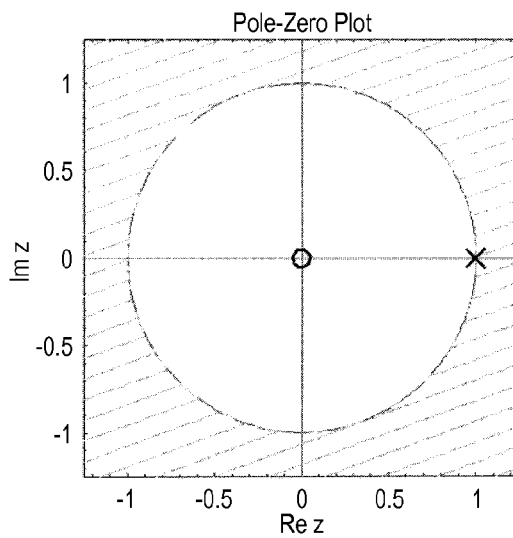
FIGS. 9A to 9C are explanatory diagrams of a stability determining method.
Figure 9B:
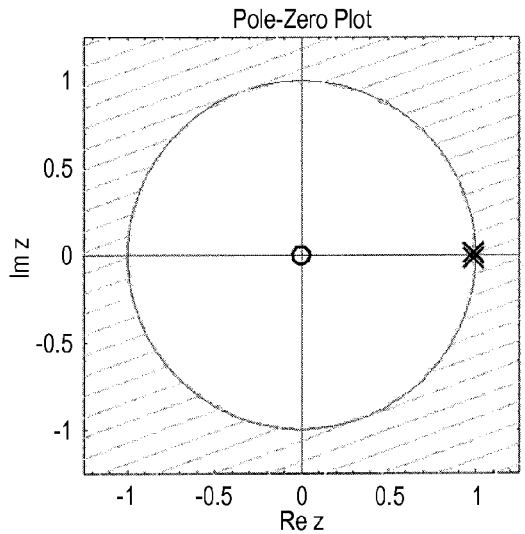
Figure 9C:
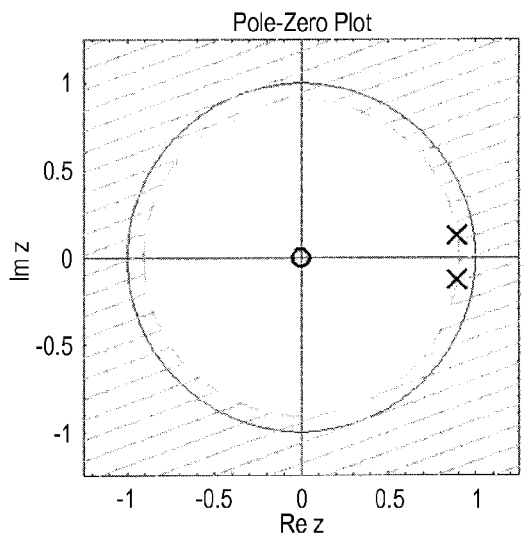

Specific examples are shown in FIGS. 9A to 9C. All the specific examples are examples in which poles fit in a unit circle. When the poles are outside the unit circle, it is determined that the digital filter is unstable. When poles are present in positions away from the circumference of the unit circle to the inner side by some degree as shown in FIG. 9C, there is no particular problem. However, when poles are present in positions very close to the unit circuit as shown in FIG. 9A (FIG. 9A is an example in which two poles are present in positions limitlessly close to each other rather than in an equal root), caution is required. This is because, depending on a mounting method of the digital filter, it is likely that an error occurs in a design value. When the error is a factor of moving the positions of the poles in the outer side direction of the unit circle, the digital filter without margin in stability as shown in FIG. 9A is likely to perform unstable operation during mounting, although the digital filter is stable in design. Therefore, some measures need to be taken.

1.4.3 Configuration Example in which the Digital Filter is Used

Figure 10:
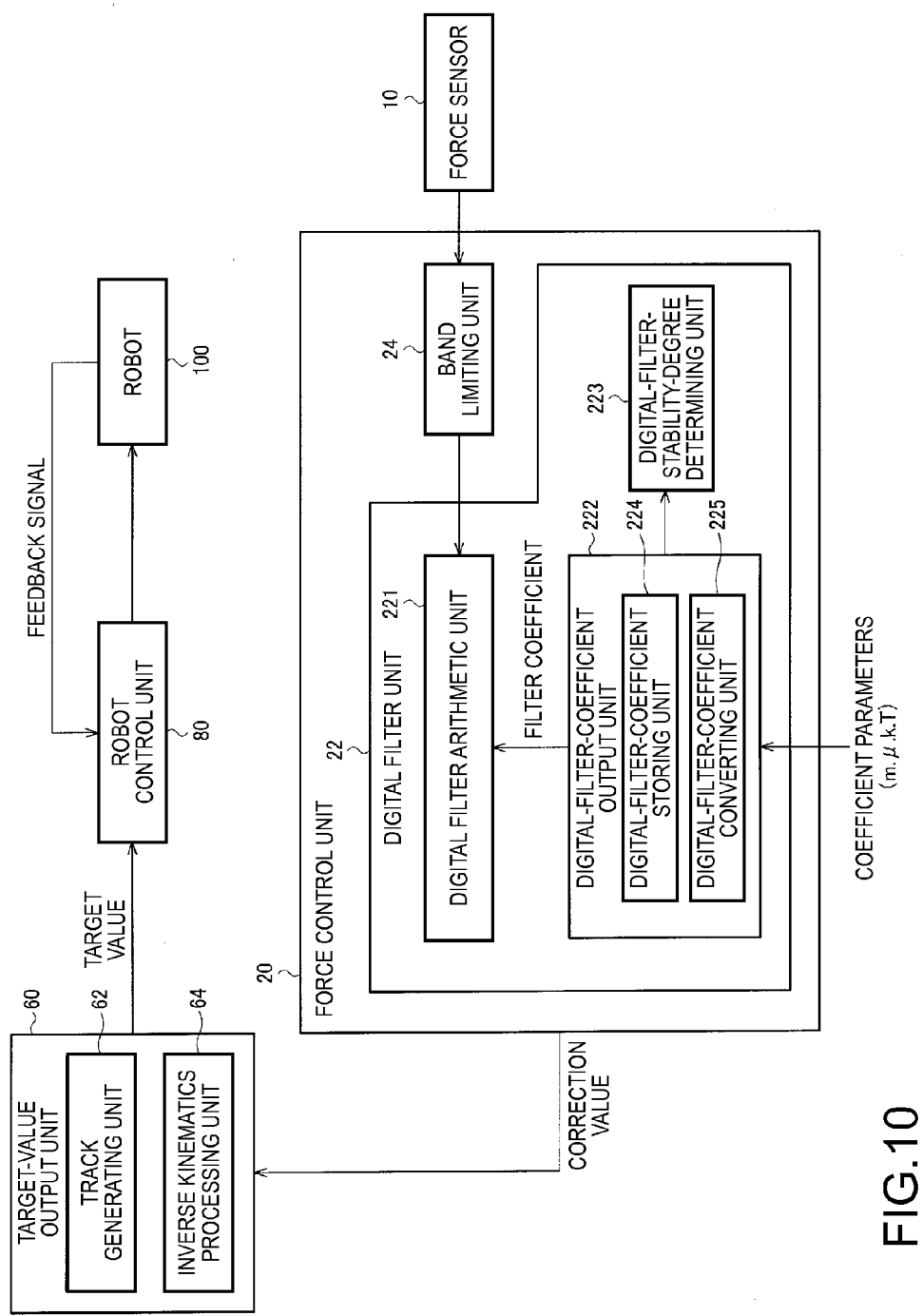
FIG. 10 is a basic configuration example of a robot control system and a robot system in which a digital filter is used.

A configuration example of the robot control system and the robot system including the robot control system in calculating a solution of the equation of motion using the digital filter is shown in FIG. 10. The robot control system and the robot system according to this embodiment are not limited to the configuration shown in FIG. 10. Various modifications are possible, for example, a part of components of the robot control system and the robot system are omitted and other components are added. The force sensor 10, the target-value output unit 60, the robot control unit 80, and the robot 100 are the same as those shown in FIG. 1. Therefore, detailed explanation thereof is omitted. The force control unit 20 includes a digital filter unit 22. The digital filter unit 22 applies digital filter processing to sensor information (including information obtained by applying the correction and the band limiting processing to the sensor information) obtained from the force sensor and outputs an output value to the target-value output unit 60 as a correction value. The force control unit 20 may include a band limiting unit 24 that applies the band limiting processing to the sensor information.

The digital filter unit 22 includes a digital filter arithmetic unit 221, a digital-filter-coefficient output unit 222, and a digital-filter-stability-degree determining unit 223. The digital filter arithmetic unit 221 performs the digital filter processing to calculate a solution of the equation of motion on the basis of the sensor information and a digital filter coefficient. The digital-filter-coefficient output unit 222 calculates the digital filter coefficient on the basis of the coefficient parameters (the mass term m, the viscosity term μ the elasticity term k, and the driving period T) of the equation of motion and outputs the digital filter coefficient to the digital filter arithmetic unit 221 and the digital-filter-stability-degree determining unit 223. The digital-filter-stability-degree determining unit 223 performs determination of stability of the digital filter on the basis of the digital filter coefficient.

The digital-filter-coefficient output unit 222 may include a digital-filter-coefficient storing unit 224 and a digital-filter-coefficient converting unit 225. The digital-filter-coefficient converting unit 225 converts the coefficient parameters of the equation of motion into the digital filter coefficient. The digital-filter-coefficient storing unit 224 stores the converted digital filter coefficient. If a plurality of digital filter coefficients are stored in the digital-filter-coefficient storing unit 224 in advance, it is possible to switch an operation characteristic of the robot and responsiveness of a solution by switching a digital filter coefficient to be output.

First to fourth embodiments are explained below using the configuration shown in FIG. 10 as a basis. The first embodiment is a basic form of the invention. The second embodiment is an example in which a plurality of filters are caused to operate in parallel when the plurality of filters are switched. Specifically, a plurality of the digital filter arithmetic units 221 are provided. The third embodiment is an example in which only one digital filter arithmetic unit 221 is used when the plurality of filters are switched. In this case, when a driving frequency is switched, it is necessary to perform processing for the switching. The fourth embodiment is an example in which filter selection processing in switching the plurality of filters is performed on the basis of sensor information.

2. First Embodiment 2.1 Configuration

Figure 11:
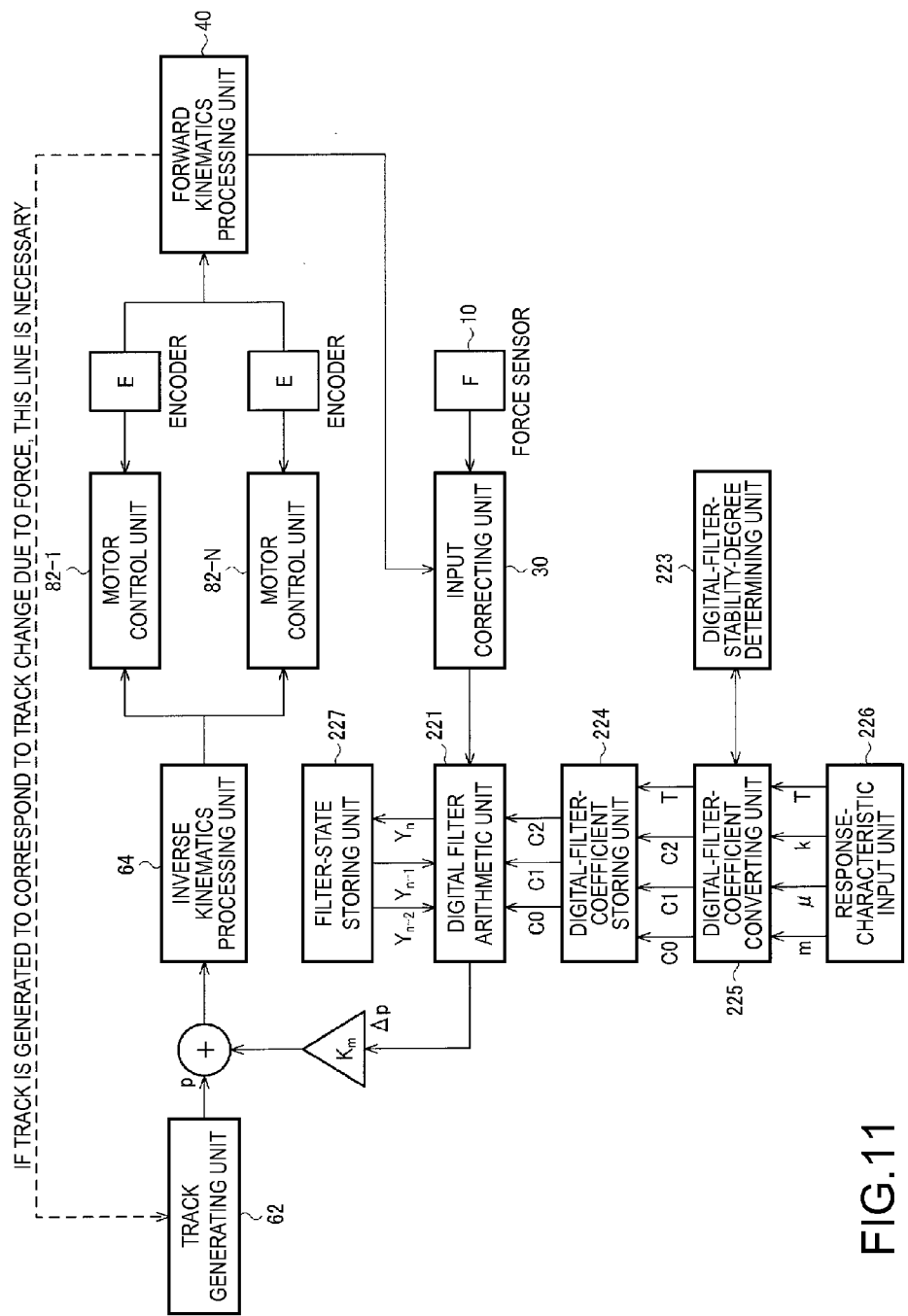
FIG. 11 is a configuration example of a robot control system and a robot system according to a first embodiment.

A configuration example of a robot system including a robot control system according to the first embodiment is shown in FIG. 11.

Since the force sensor 10, the track generating unit 62, the inverse kinematics processing unit 64, the motor control unit 82-1, and the like are the same as those shown in FIG. 1. Therefore, detailed explanation thereof is omitted. An input correcting unit 30 applies correction processing to sensor information. For example, the input correcting unit 30 may include, for example, the posture correcting unit 532 and the hand-tool-own-weight correcting unit 534 shown in FIG. 7. A forward kinematics processing unit 40 corresponds to the forward kinematics processing unit 540 shown in FIG. 7. The forward kinematics processing unit 40 outputs a result of forward kinematics processing to the input correcting unit 30 and outputs the result to the track generating unit 62 as well according to necessity.

The robot control system includes the digital-filter arithmetic unit 221, the digital-filter-stability-degree determining unit 223, the digital-filter-coefficient storing unit 224, the digital-filter-coefficient converting unit 225, a response-characteristic input unit 226, and a filter-state storing unit 227. Specifically, these units are included in the digital filter unit 22 of the force control unit 20.

The digital filter arithmetic unit 221, the digital-filter-stability-degree determining unit 223, the digital-filter-coefficient storing unit 224, and the digital-filter-coefficient converting unit 225 are explained above with reference to FIG. 10. Therefore, details of the units are not explained.

The response-characteristic input unit 226 outputs the coefficient parameters (m, μ, and k) of the equation of motion and the driving period T (the driving frequency) to the digital-filter-coefficient converting unit 225.

The filter-state storing unit 227 stores a filter state. The filter state is an output of the digital filter arithmetic unit 221 (i.e., a solution of the equation of motion). As explained above, the equation of motion corresponds to the two-pole digital filter. Specifically, the equation of motion is as shown in FIG. 8. As it is evident from FIG. 8, the digital filter is delayed twice. Therefore, in order to calculate an output value at certain timing, an output value at the immediately preceding timing and an output value at the second immediately preceding timing are necessary. The filter-state storing unit 227 stores the output values. The filter-state storing unit 227 stores an output of the digital filter arithmetic unit 221 and sends output values in the past to the digital filter arithmetic unit 221.

2.2 Detailed Processing

Figure 12:
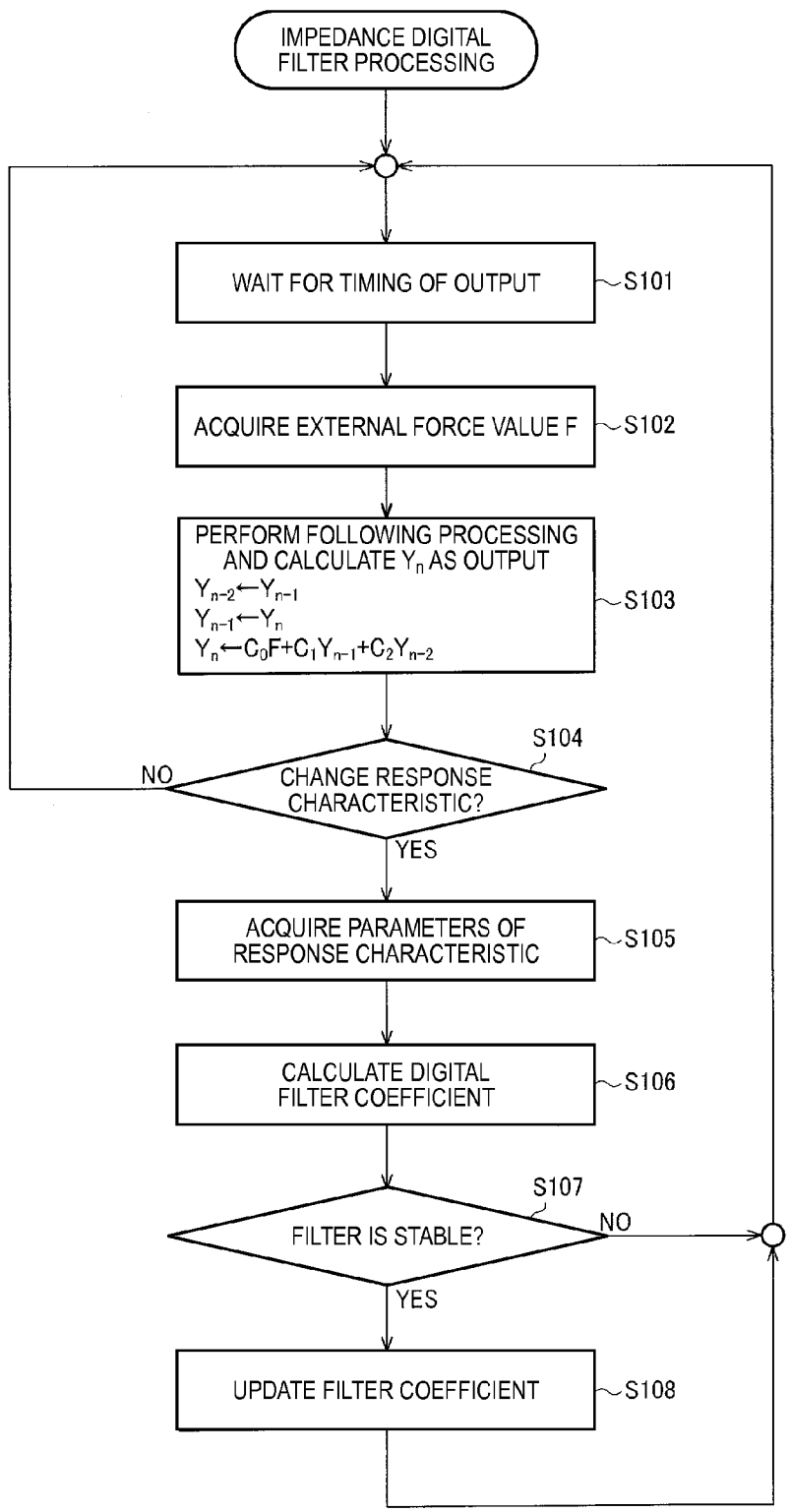
FIG. 12 is a flowchart for explaining processing according to the first embodiment.

A detailed processing example of this embodiment is explained with reference to a flowchart of FIG. 12. FIG. 12 is a flowchart concerning processing in the digital filter unit 22.

When this processing is started, first, after waiting for timing of output (S101), the digital filter unit 22 acquires an external force value F (S102). It is assumed that the external force value F is obtained by applying the correction processing by the input correcting unit 30 to sensor information acquired from the force sensor 10.

The digital filter unit 22 calculate a solution of the equation of motion using the acquired external force value F (S103). Specifically, the digital filter unit 22 changes, in the filter-state storing unit 227, an output $Y_{n-1}$ of the digital filter arithmetic unit 221 at the immediately preceding step to a value $Y_{n-2}$ and overwrites the output $Y_{n-1}$ with a value $Y_n$. The digital filter unit 22 performs, in the digital filter arithmetic unit 221, processing for calculating an output value $Y_n$ from the digital filter coefficient (C0, C1, and C2) output from the digital-filter-coefficient storing unit 224 and the output values in the past ($Y_{n-1}$ and $Y_{n-2}$) output from the filter-state storing unit 227.

The processing explained above is processing for calculating a solution of the equation of motion at certain one timing. After the processing at the one timing, the digital filter unit 22 performs determination whether a response characteristic at the next timing is changed (S104). If the response characteristic is not changed, the digital filter unit 22 returns to S101. If the response characteristic is changed, first, the digital filter unit 22 acquires the parameters (m, μ, k, and T) of the response characteristic from the response-characteristic input unit 226 (S105). The digital filter unit 22 calculates a digital filter coefficient in the digital-filter-coefficient converting unit 225 (S106). The digital filter unit 22 determines, in the digital-filter-stability-degree determining unit 223, stability of the digital filter on the basis of the calculated digital filter coefficient (S107). If the filter is not stable, the digital filter unit 22 returns to S101 without storing the digital filter coefficient in the digital-filter-coefficient storing unit 224. In other words, the response characteristic is not changed in the next step. If it is determined in S107 that the filter is stable, the digital filter unit 22 stores the digital filter coefficient in the digital-filter-coefficient storing unit 224 (S108) and performs processing in the next step using the digital filter coefficient updated by returning to S101.

In this embodiment explained above, the robot control system includes, as shown in FIG. 10, the force control unit 20 that outputs a correction value concerning a target track of the robot on the basis of sensor information acquired from the force sensor 10, the target-value output unit 60 that corrects the target track on the basis of the correction value to output a target value, and the robot control unit 80 that performs feedback control of the robot 100 on the basis of the target value. The force control unit 20 includes the digital filter unit 22. The force control unit 20 applies the digital filter processing by the digital filter unit 22 to the sensor information to calculate a solution of the ordinary differential equation in the force control and outputs the correction value on the basis of the calculated solution.

The target value is a target value in the feedback control of the robot 100. The control in the robot control unit 80 is performed on the basis of the target value. The target value can be acquired by applying the correction processing by the correction value to a target track. In a narrow sense, the target track may be a target track representing a change in a spatial target position of the end effecter section (the end point) of the robot. One target position is represented by, for example, a three-dimensional space coordinate xyz (if posture is also taken into account, rotation angles uvw around axes may be added). The target track is a set of the target positions. However, the target track is not limited to this and may be a set of target joint angles of the robot. In a robot including joints, when angles of the joints are determined, the position of the end effecter section is uniquely determined by the forward kinematics processing. Specifically, in an N-joint robot, one target position can be represented by N joint angles (θ1 to θN). Therefore, if a set of the N joint angles is set as one target joint angle, the target track can be considered a set of target joint angles. Therefore, the correction value output from the force control unit 20 may be a value concerning a position or may be a value concerning a joint angle.

Figure 21A:
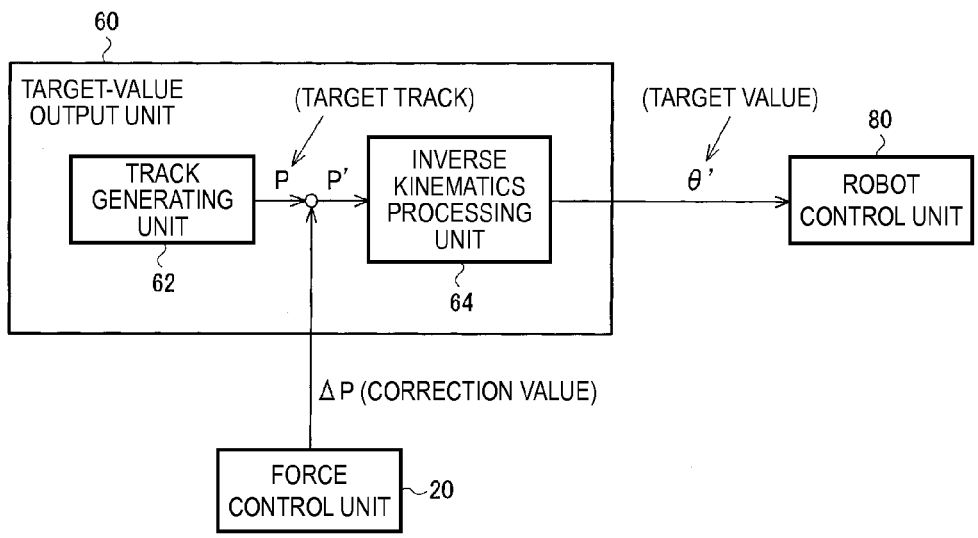
FIGS. 21A and 21B are specific system configuration examples for calculating a target track, a correction value, and a target value.
Figure 21B:
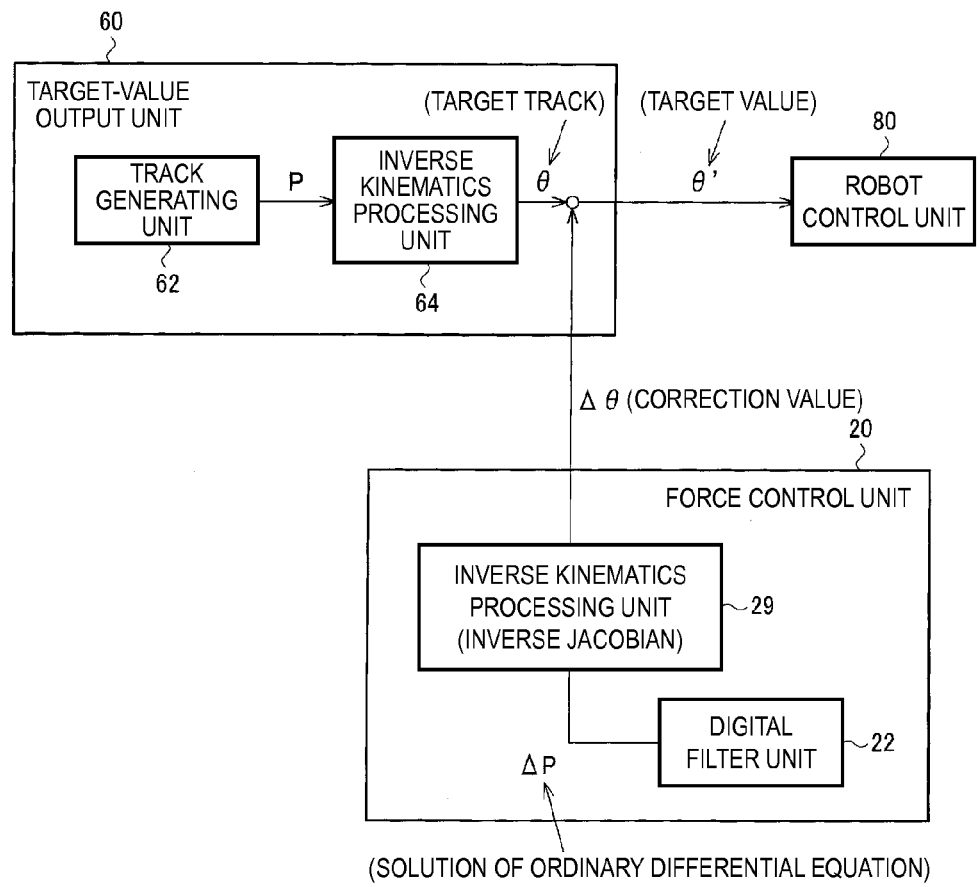

Specific examples are shown in FIGS. 21A and 21B. If the equation of motion of Formula (1) is used as the ordinary differential equation, a solution of which is calculated by the digital filter processing, a solution of the equation of motion is a value concerning a position. Therefore, when the target track is the target position, the target track only has to be directly set as the correction value. A system configuration example is as shown in FIG. 21A. The target value may be a value concerning a position or may be a value concerning a joint angle. In general, it is assumed the joint angle is used in the feedback control of the robot.

On the other hand, it is also conceivable that, as shown in FIG. 21B, the force control unit 20 includes an inverse kinematics processing unit 29 separately from the inverse kinematics processing unit 64 of the target-value output unit 60. For example, timing of processing and processing rates are different in target track generation processing in the target-value output unit 60 and correction value output processing in the force control unit 20. In that case, the target track is a target joint angle. The force control unit 20 applies conversion processing (e.g., inverse kinematics processing) to the solution of the equation of motion to obtain the correction value.

The ordinary differential equation in the force control is an ordinary differential equation, a solution of which needs to be calculated in the force control. In a narrow sense, the ordinal differential equation may be a linear ordinary differential equation. In a narrower sense, the ordinary differential equation is an ordinary differential equation, a solution of which needs to be calculated in order to cause the robot 100 to behave as if the robot 100 has desired characteristics (mass, viscosity, elasticity, etc.). The ordinary differential equation may be the equation of motion indicated by Formula (1). Consequently, it is possible to perform, using the digital filter, processing for calculating a solution of the ordinary differential equation necessary in the force control. Compared with the processing performed using the Newton method, the Runge-Kutta method, or the like, hardwaring is easy and determination of stability is also easy as explained above. Further, it is also possible to easily switch a response characteristic by switching a digital filter used for the digital filter processing (e.g., switching a filter coefficient).

The digital filter unit 22 may include, as shown in FIG. 10, the digital-filter-coefficient output unit 222 that outputs a digital filter coefficient on the basis of the coefficient parameters of the terms of the ordinary differential equation and the digital filter arithmetic unit 221 that performs the digital filter processing on the basis of a digital filter coefficient and sensor information.

The coefficient parameters of the terms of the ordinary differential equation indicate a constant term, a coefficient of a primary differential term, a coefficient of a secondary differential term, . . . , and a coefficient of an n-ary differential term in the ordinary differential equation. In the example of Formula (1), m, $\mu$, and k are coefficient parameters. The sensor information used for the digital filter processing may be an output value itself from the force sensor 10, may be the output value subjected to the correction processing by the input correcting unit 30 (shown in FIG. 11), or may be the output value subjected to the band limiting processing by the band limiting unit 24 (shown in FIG. 10).

Consequently, it is possible to, after outputting a digital filter coefficient necessary for the digital filter processing, perform the digital filter processing based on the digital filter coefficient and sensor information.

The digital-filter-coefficient output unit 222 may include, as shown in FIGS. 10 and 11, the digital-filter-coefficient converting unit 225 that converts the coefficient parameters of the ordinary differential equation into a digital filter coefficient and the digital-filter-coefficient storing unit 224 that stores the digital filter coefficient. The digital-filter-coefficient output unit 222 outputs the digital filter coefficient stored in the digital-filter-coefficient storing unit 224.

Consequently, it is possible to calculate the digital filter coefficient from the coefficient parameters of the ordinary differential equation. When the force control is performed, first, an ordinary differential equation necessary for the force control is determined. For example, if a physical characteristic desired to be imparted to the robot 100 is determined, an equation of motion in which specific numerical values are substituted in m, $\mu$, and k of Formula (1) is determined. However, coefficient parameters of the ordinary differential equation and the digital filter coefficient are different. Therefore, when the ordinary differential equation is determined, processing for calculating a digital filter (specifically, a digital filter coefficient) for calculation a solution of the ordinary differential equation is necessary. In this embodiment, this processing is performed in the digital-filter-coefficient converting unit 225.

The digital filter unit 22 may include, as shown in FIG. 10, the digital-filter-stabilization-degree determining unit 223 that determines a stabilization degree (stability) of the digital filter used for the digital filter processing. When it is determined that the digital filter is stable, the digital-filter-coefficient output unit 222 outputs the digital filter coefficient.

Consequently, it is possible to determine stability of the digital filter. The coefficient parameters of the ordinary differential equation in the force control sometimes form, depending on setting, a system that is impossible in reality (e.g., an oscillating robot). Therefore, it is necessary to determine stability of the ordinary differential equation. However, if the digital filter is used, the determination is easy. Details are as explained above.

In this embodiment, switching of the driving frequency of the digital filter is not explained (explained in second and third embodiments below). However, this does not prevent the switching of the driving frequency from being performed using the basic configuration shown in FIG. 10. Specifically, the digital filter processing may be performed while the driving frequency is switched between a first driving frequency and a second driving frequency higher than the first driving frequency. In that case, the digital-filter-coefficient output unit 222 outputs at least one of a first digital filter coefficient corresponding to the first driving frequency and a second digital filter coefficient corresponding to the second driving frequency. The digital filter arithmetic unit 221 performs, according to the output digital filter coefficient, at least one of digital filter processing by the first driving frequency in which the first digital filter coefficient is used and digital filter processing by the second driving frequency in which the second digital filter coefficient is used.

Consequently, it is possible to switch the driving frequency of the digital filter processing. It is possible to switch responsiveness of a solution of the ordinary differential equation by switching the driving frequency.

The ordinary differential equation in this embodiment may be an equation of motion including an imaginary mass term, an imaginary viscosity term, and an imaginary elasticity term as coefficient parameters.

Consequently, it is possible to calculate a solution of the equation of motion. Therefore, it is possible to cause the robot 100 to behave as if the robot 100 has mass corresponding to the imaginary mass term, viscosity corresponding to the imaginary viscosity term, and elasticity corresponding to the imaginary elasticity term.

The target-value output unit 60 may includes, as shown in FIG. 10, the track generating unit 62 that outputs target position information of the robot 100 and the inverse kinematics processing unit 64 that performs inverse kinematics processing on the basis of the target position information from the track generating unit 62 and output joint angle information of the robot 100.

The target position information is information concerning target position of the robot 100 (in a narrow sense, an end effecter section of the robot 100). The target position is represented by, for example, xyz (which may include uvw concerning posture). The target position information may be information concerning one target position or may be information concerning a plurality of target positions representing a temporal position change (a moving path) of the robot 100.

Consequently, it is possible to, after outputting the target position information of the robot 100, perform the inverse kinematics processing and convert the target position information into joint angle information. Since the track generating unit 62 generates the target position information of the robot 100, it is possible to systematically control the robot 100. However, it is natural to provide joints in the robot 100 in order to flexibly move the robot 100. In that case, in general, robot control is performed by controlling angles of the joints. Therefore, it is difficult to directly set the target position information as a target value. The inverse kinematics processing unit 64 that converts the target position information into joint angle information is necessary.

This embodiment explained above relates to a robot system including the robot control system (including the force control unit 20, the target-value output unit 60, and the robot control unit 80) and the robot 100.

Consequently, it is possible to realize not only a robot control apparatus but also a robot system that executes the processing in this embodiment.

This embodiment explained above can be applied to a sensor information processing apparatus including a sensor-information acquiring unit that acquires sensor information from a sensor and a sensor-information processing unit that applies processing to the acquired sensor information. The sensor-information processing unit includes a digital filter unit. The sensor-information processing unit applies digital filter processing by the digital filter unit to the sensor information to calculate a solution of an ordinary differential equation in the sensor information processing and outputs the solution as an output value of the sensor information processing.

In the above explanation, the sensor information processing apparatus is applied to the robot control system. In the robot control system, the sensor information processing apparatus is equivalent to the force control unit 20 shown in FIG. 10 and the like and the sensor is equivalent to the force sensor 10. The sensor-information acquiring unit is not specifically shown in the figures. However, a block (in the case of FIG. 10, the band limiting unit 24) connected to the force sensor 10 may function as the sensor-information acquiring unit. The sensor-information processing unit corresponds to the digital filter unit 22 shown in FIG. 10. The sensor-information processing unit may further include the band limiting unit 24 and the input correcting unit 30 shown in FIG. 11. However, the sensor-information processing apparatus is not limited to be applied to the robot control system and may be applied to other control systems. In that case, the sensor-information processing apparatus outputs information used in control on the basis of sensor information processing (including digital filter processing) applied to sensor information. Further, the sensor information processing apparatus is not limited to the application to the control system and may be used in other systems (apparatuses). For example, the sensor information processing apparatus may be used in a detection system that detects various kinds of information using a sensor.

The sensor information processing means processing for applying some kind of processing to an output value from the sensor and calculating useful information. The sensor information processing includes processing for calculating at least a solution of an ordinary differential equation. For example, in the robot control system, the sensor information processing is conversion processing into information having physically different meaning, for example, processing for calculating a correction value (e.g., a correction value of a target position of a robot) from force information related to a force sensor. In the detection system, for example, processing for improving detection accuracy (e.g., processing for reducing noise included in sensor information) is conceivable.

The application of the sensor information processing apparatus is not limited to the robot control system. Likewise, the sensor that outputs the sensor information is not limited to the force sensor. The sensor may be, for example, an acceleration sensor, an angular velocity sensor, a direction sensor, a biosensor (a pulse sensor, etc.), and a GPS.

Consequently, it is possible to realize the sensor information processing apparatus that calculate a solution of the ordinary differential equation and outputs an output value according to the digital filter processing applied to the sensor information. The sensor information processing apparatus may be realized as, for example, an IC chip including a sensor. For example, a solution of the ordinary differential equation in which the sensor information is used can be output rather than the sensor information itself. Therefore, usefulness of an output value of the apparatus is increased when the apparatus is combined with another system or the like.

3. Second Embodiment

In a second embodiment, it is assumed that a driving frequency of a digital filter is switched. For example, it is conceivable to switch the driving frequency according to band limitation. In general, noise is often included in sensor information of a force sensor. Therefore, it is desirable to perform band limiting processing. However, the width of a pass band varies depending on a situation (if a large signal value is obtained with respect to noise, the band limiting processing may be rather light and the pass band can be set wide). As the pass band is set narrower, the noise further decreases but a response characteristic is further deteriorated. Therefore, it is necessary to switch the driving frequency of the digital filter as well to correspond to the pass band. Specifically, when the pass band is set wide, the digital filter is caused to operate at a high driving frequency and, when the pass band is set narrow, the digital filter is caused to operate at a low driving frequency.

In this embodiment, a plurality of the digital filter arithmetic units 221 are provided. Sensor information subjected to band limiting processing, in which different pass bands are set, are respectively input to the digital filter arithmetic units 221 to cause the digital filter arithmetic units 221 to operate at different driving frequencies. In other words, two filters having different driving frequencies are caused to operate in parallel and an appropriate filter is selected according to a situation. In an example explained below, the two filters are caused to operate in parallel. However, three or more digital filters may be caused to operate in parallel.

3.1 Configuration

Figure 13:
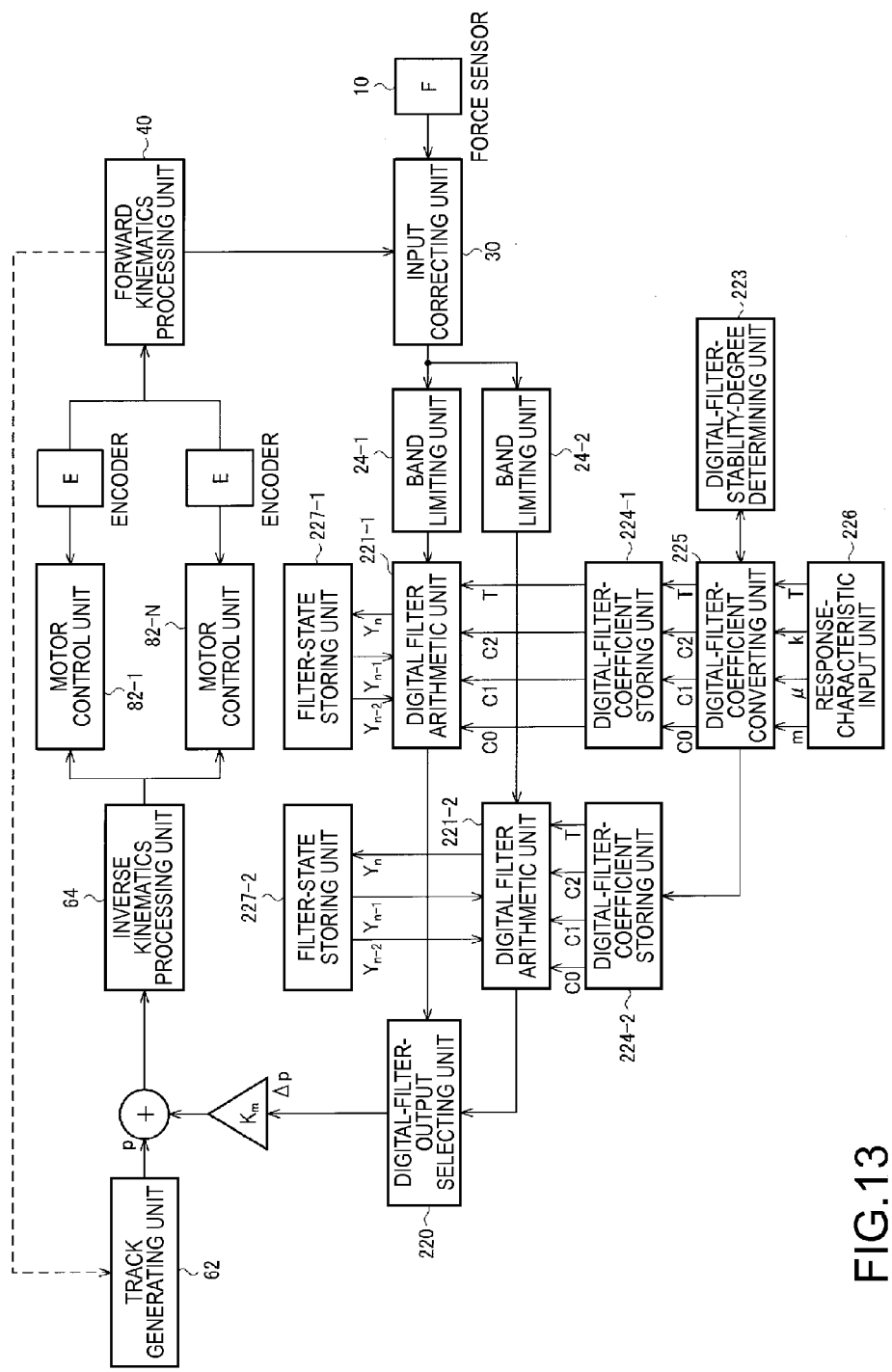
FIG. 13 is a configuration example of a robot control system and a robot system according to a second embodiment.

A configuration example of a robot system including a robot control system according to the second embodiment is shown in FIG. 13.

Detailed explanation is omitted concerning components same as those in the first embodiment (FIG. 11). When compared with the first embodiment, the robot system according to the second embodiment is different in that a pair of the digital filter arithmetic units 221 (221-1 and 221-2), a pair of the digital-filter-coefficient storing units 224 (224-1 and 224-2), and a pair of the filter-state storing units 227 (227-1 and 227-2) are provided. The digital filter unit 22 includes band limiting units 24-1 and 24-2 and a digital-filter-output selecting unit 220.

The band limiting unit 24-1 applies band limiting processing for setting a first frequency band as a pass band to sensor information and outputs the sensor information to the digital filter arithmetic unit 221-1. The band limiting unit 24-2 applies band limiting processing for setting a second frequency band, which is different from the first frequency band, as a pass band to the sensor information and outputs the sensor information to the digital filter arithmetic unit 221-2.

The digital-filter-output selecting unit 220 receives outputs of the digital filter arithmetic units 221-1 and 221-2, selects one of the outputs, and outputs a selected value to the digital filter unit 22 as an output value.

The digital-filter-coefficient storing unit 224-1 stores a first digital filter coefficient determined as stable as a result of performing the processing in S105 to S107 in FIG. 12. Similarly, the digital-filter-coefficient storing unit 224-2 stores a second digital filter coefficient different from the first digital filter coefficient.

The digital filter arithmetic unit 221-1 performs digital filter processing on the basis of the first digital filter coefficient stored in the digital-filter-coefficient storing unit 224-1, the sensor information after the band limiting processing output from the band limiting unit 24-1, and an output value in the past output from the filter-state storing unit 227-1.

Similarly, the digital filter arithmetic unit 221-2 performs digital filter processing on the basis of the second digital filter coefficient stored in the digital-filter-coefficient storing unit 224-2, the sensor information after the band limiting processing output from the band limiting unit 24-2, and an output value in the past output from the filter-state storing unit 227-2. In other words, the two digital filters operate in parallel.

3.2 Detailed Processing

Figure 14:
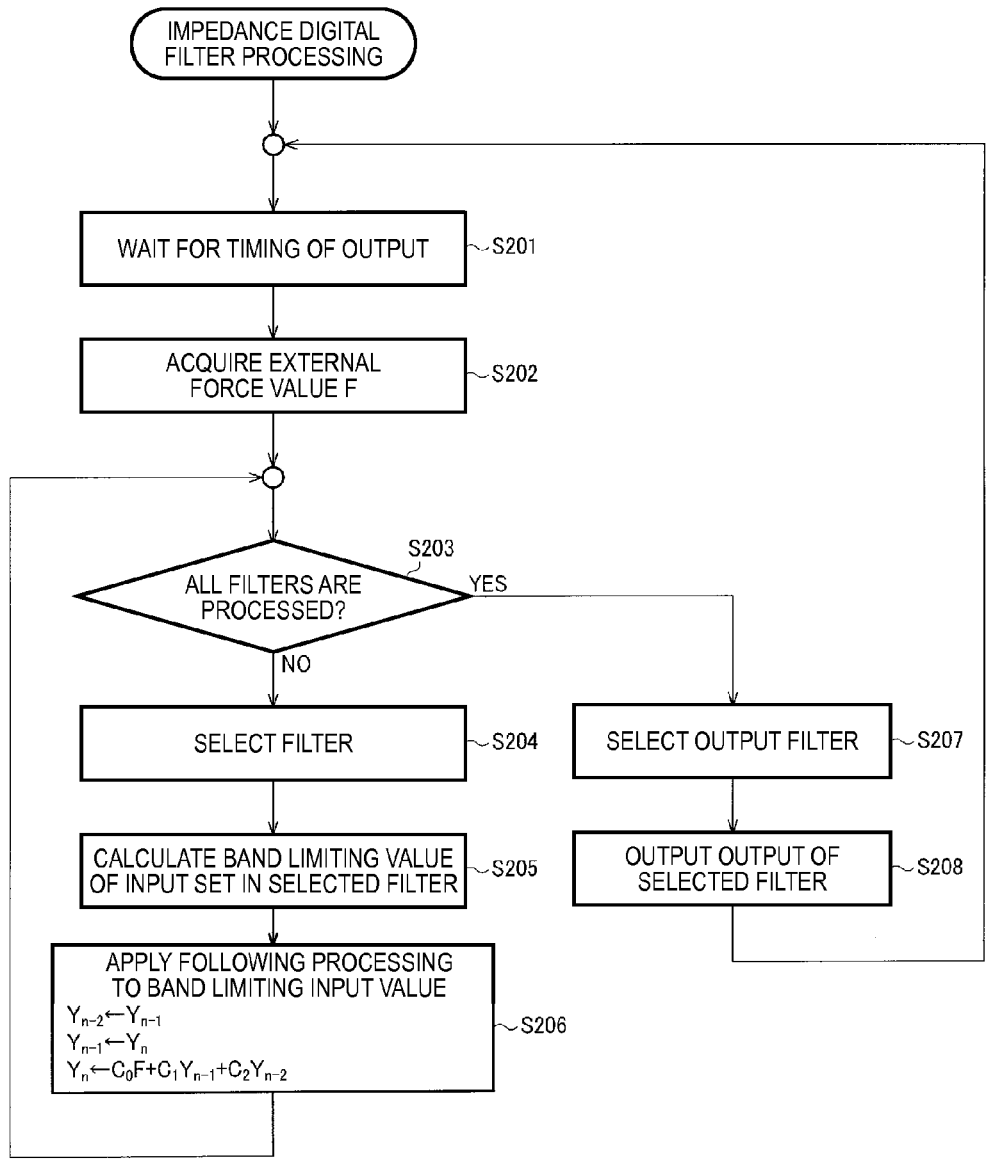
FIG. 14 is a flowchart for explaining processing according to the second embodiment.

A detailed processing example in this embodiment is explained with reference to a flowchart of FIG. 14. FIG. 14 is a flowchart concerning processing in the digital filter unit 22.

When this processing is started, first, after waiting for timing of output (S201), the digital filter unit 22 acquires the external force value F (S202). It is assumed that the external force value F is obtained by applying the correction processing by the input correcting unit 30 to sensor information acquired from the force sensor 10.

Subsequently, the digital filter unit 22 determines whether the processing is performed concerning all the filters operating in parallel (S203). If an unprocessed filter remains, the digital filter unit 22 selects the filter (S204) and performs, in a band limiting unit (a band limiting unit corresponding to the filter among the band limiting units 24-1 and 24-2), band limiting processing corresponding to the selected filter (S205). The digital filter unit 22 performs, in the digital filter arithmetic unit corresponding to the selected filter, the digital filter processing using the sensor information subjected to the band limiting processing as an input value (S206). Details of S206 are the same as S103. After the processing, the digital filter unit 22 returns to S203.

If it is determined in S203 that all the filters are processed, the digital filter unit 22 selects, in the digital-filter-output selecting unit 220, an output filter out of the plurality of filters (S207) and outputs an output value of the selected filter (S208). After the processing in S208, the digital filter unit 22 returns to S201.

In this embodiment explained above, the digital filter unit 22 includes, as shown in FIG. 13, the first digital filter arithmetic unit (221-1) and the second digital filter arithmetic unit (221-2) as the digital filter arithmetic unit 221. The digital-filter-coefficient output unit 222 outputs the first digital filter coefficient to the first digital filter arithmetic unit and outputs the second digital filter coefficient to the second digital filter arithmetic unit. The first digital filter arithmetic unit performs the digital filter processing based on the first digital filter coefficient and the sensor information. The second digital filter arithmetic unit performs the digital filter processing based on the second digital filter coefficient and the sensor information. Consequently, it is possible to perform a plurality of kinds of digital filter processing in parallel. Therefore, when switching of a digital filter coefficient for switching a characteristic of the robot is performed, the digital filter processing before and after the switching is caused to operate in parallel in advance. Therefore, it is possible to smoothly perform the switching. In switching of the driving frequency, it is unnecessary to perform switching processing in a third embodiment explained below.

The digital filter unit 22 may include, as shown in FIG. 13, the digital-filter-output selecting unit 220 that selects any one of a processing result in the first digital filter arithmetic unit and a processing result in the second digital filter arithmetic unit and outputs the processing result as a correction value.

Consequently, even when the plurality of digital filters are operating in parallel, it is possible to select an appropriate digital filter and output a processing result of the selected digital filter as a correction value. The selection of a digital filter is directly related to content of the force control (e.g., behavior of the robot 100). Therefore, it is necessary to select an appropriate digital filter such that control desired by a user is performed.

The digital filter processing may be performed at a driving frequency of any one of a first driving frequency and a second driving frequency (higher than the first driving frequency). In that case, the digital-filter-coefficient output unit 222 outputs a value corresponding to the first driving frequency as the first digital filter coefficient and outputs a value corresponding to the second driving frequency as the second digital filter coefficient. The first digital filter arithmetic unit performs the digital filter processing by the first driving frequency using the first digital filter coefficient and performs the digital filter processing by the second driving frequency using the second digital filter coefficient.

Consequently, it is possible to switch the driving frequency of the digital filter processing. It is possible to switch responsiveness of a solution of the normal differential equation by switching the driving frequency. In this embodiment, both before and after the switching, the digital filter processing by the first driving frequency and the digital filter processing by the second driving frequency are performed in parallel. Therefore, it is possible to smoothly perform the switching. The force control unit 20 may include, as shown in FIG. 10, the band limiting unit 24 that applies band limiting processing for allowing a given frequency band to pass to the sensor information and outputs the sensor information subjected to the band limiting processing to the digital filter arithmetic unit. The band limiting unit 24 outputs, to the first digital filter arithmetic unit, the sensor information subjected to band limiting processing for allowing a first frequency band to pass and outputs, to the second digital filter arithmetic unit, the sensor information subjected to band limiting processing for allowing a second frequency band (which is wider than the first frequency band) to pass.

The band limiting unit 24 may include, as shown in FIG. 13, the band limiting unit 24-1 and the band limiting unit 24-2. Consequently, it is possible to apply the band limiting processing to the sensor information according to the driving frequency. Specifically, pass band width is wider as the driving frequency is higher. The pass band width is narrower as the driving frequency is lower. This is because, as explained above, as the band limiting processing is intensified, the response characteristic is further deteriorated. In this way, the intensity of the band limiting processing and the driving frequency have a correspondence relation. However, whichever of the intensity of the band limiting processing and the driving frequency may be determined earlier. When the sensor information includes a lot of noise, it is desirable to intensely apply the band limiting processing to the sensor information to remove the noise. In other words, from the viewpoint of a noise amount, in some case, the intensity of the band limiting processing is determined first and the driving frequency is determined according to the intensity of the band limiting processing. In other cases, from the viewpoint of responsiveness of a solution of the ordinary differential equation, the driving frequency is determined first (e.g., the driving frequency is set high because a solution is desired to be obtained immediately) and the intensity of the band limiting processing is determined according to the driving frequency.

4. Third Embodiment

In a third embodiment, as in the second embodiment, it is assumed that a driving frequency of a digital filter is switched. In this embodiment, a configuration including only one digital filter arithmetic unit 221 that performs digital filter processing is explained. When only one digital filter arithmetic unit 221 is provided, it is necessary to perform switching processing when the driving frequency is switched. Specifically, as the switching processing, switching from a high frequency to a low frequency and switching from a low frequency to a high frequency are separately explained.

4.1 Configuration

Figure 15:
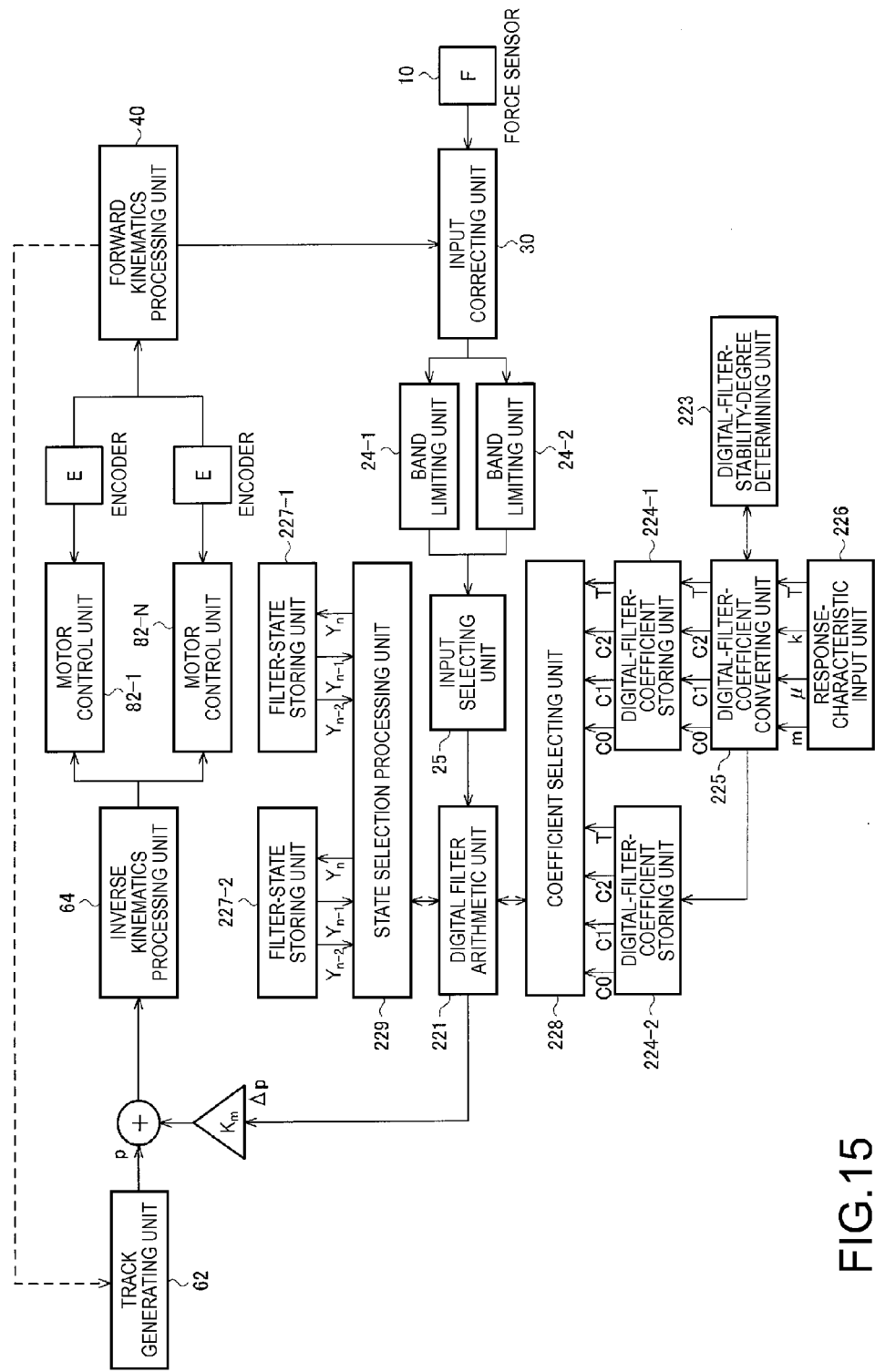
FIG. 15 is a configuration example of a robot control system and a robot system according to a third embodiment.

A configuration example of a robot system including a robot control system according to the third embodiment is shown in FIG. 15. Detailed explanation of components same as those in the second embodiment (FIG. 13) is omitted. When compared with the second embodiment, the third embodiment is different in that only one digital filter arithmetic unit 221 is provided. Further, the robot system includes the input selecting unit 25, a coefficient selecting unit 228, and a state selection processing unit 229.

The coefficient selecting unit 228 selects one coefficient used for the digital filter processing from a first digital filter coefficient output from the digital-filter-coefficient storing unit 224-1 and a second digital filter coefficient output from the digital-filter-coefficient storing unit 224-2 and outputs the selected digital filter coefficient to the digital filter arithmetic unit 221. This can be considered as selecting, out of a plurality of digital filters, an output filter used for output.

The state selection processing unit 229 performs processing concerning a filter state of a digital filter corresponding to the digital filter coefficient selected by the coefficient selecting unit 228 (hereinafter, output filter). Specifically, the state selection processing unit 229 acquires, from a filter-state storing unit corresponding to the output filter, an output value in the past of digital filter processing in which the output filter is used and outputs the output value to the digital filter arithmetic unit 221. Further, the state selection processing unit 229 outputs an output value of the digital filter arithmetic unit 221 to the filter state storing unit corresponding to the output filter.

As explained above, in the digital filter processing in this embodiment, it is necessary to use the output value at timing in the past. When the output value is used, if a certain digital filter is selected as the output filter, naturally, an output value in the past of the selected digital filter has to be used. In other words, when the coefficient selecting unit 228 selects a digital filter coefficient corresponding to an i-th digital filter, the state selection processing unit 229 cannot select a filter state corresponding to a k-th digital filter different from the i-th digital filter. Therefore, both of the coefficient selecting unit 228 and the state selection processing unit 229 perform processing for selecting one candidate out of a plurality of candidates. However, the selection processing is not independently performed by each of the coefficient selecting unit 228 and the state selection processing unit 229. A constraint condition for selecting a candidate corresponding to the same digital filter needs to be considered.

The input selecting unit 25 selects one output out of outputs from the band limiting unit 24-1 and the band limiting unit 24-2 and outputs the selected output to the digital filter arithmetic unit 221. The input selecting unit 25 also selects an output corresponding to the output filter. A relation between a driving frequency of the digital filter and pass band width of band limiting processing is as explained above in the second embodiment. Specifically, when the output filter is selected, a pass band of the band limiting processing is also determined. The input selecting unit 25 selects an output from the band limiting unit corresponding to the pass band. Consequently, selection processing based on the selection of the output filter is performed concerning not only the coefficient selecting unit 228 and the state selection processing unit 229 but also the input selecting unit 25.

4.2 Detailed Processing 4.2.1 Switching from a High Frequency to a Low Frequency In this embodiment, it is necessary to perform switching processing in switching of the driving frequency. First, switching from a high frequency (a short period) to a low frequency (a long period) is explained.

Figure 16:
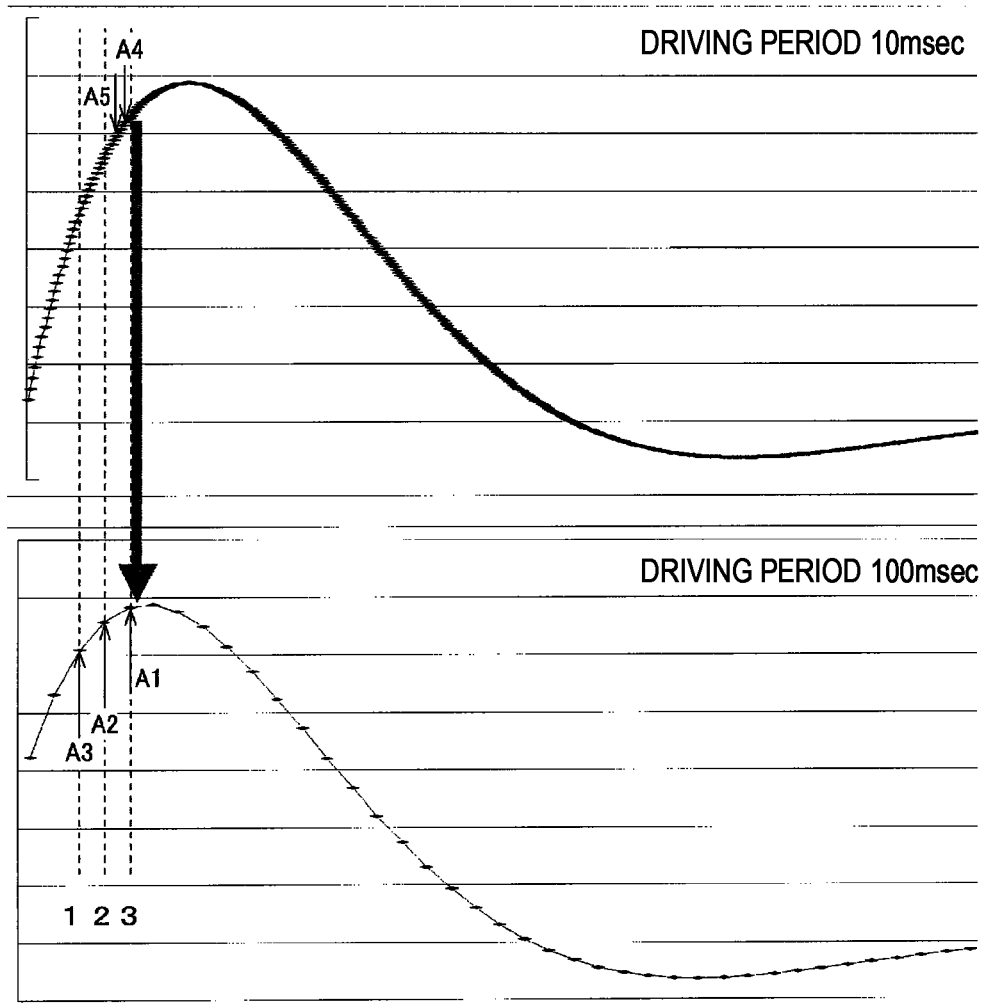
FIG. 16 is an explanatory diagram of driving frequency switching processing from a high frequency to a low frequency.

It is considered that the driving frequency is switched at timing of A1 as shown in FIG. 16. When the driving frequency is switched, to calculate an output value in a low-frequency filter after the switching, output values of the low-frequency filter at two timings in the past indicated by A2 and A3 are necessary. Even if the driving frequencies are different, sampling rates are only different and waveforms obtained by smoothly connecting sampling points should be the same. Specifically, as in an example shown in FIG. 16, if a high frequency has a sampling rate ten times as high as a sampling rate of a low frequency, it is possible to acquire output values at the immediately preceding timing and at the second immediately preceding timing in the low-frequency filter by storing output values at the tenth preceding timing and the twentieth preceding timing in a high-frequency filter.

However, if there is a condition that the filter-state storing unit 227 stores only the output values for the two timings in the past, a problem occurs. Specifically, since the high-frequency filter operates before the switching, the filter-state storing unit 227 stores only information at the two timings in the past in the high-frequency filter as indicated by A4

(timing of one timing in the past in the high-frequency filter) and A5 (timing of two timings in the past in the high-frequency filter). Output values at the timings indicated by A2 and A3 are lost.

Therefore, in this embodiment, a switching period is provided during the switching and the high-frequency filter and the low-frequency filter are caused to operate in parallel in the switching period. In FIG. 16, a switching instruction is output at the timing of A3 and the two filters are caused to operate in parallel in a period from A3 to A1. Then, the switching of the filters is performed at the timing of A1. Consequently, it is possible to acquire the output values at A3 and A2 of the low-frequency filter while continuing an output by the high-frequency filter until A1. Therefore, values necessary for an output of the low-frequency filter are collected at A1. It is possible to perform the switching processing without problems.

As explained above, the sampling rates of the high-frequency filter and the low-frequency filter are only different and outputs at the same timing of the filters should be the same. Therefore, even if the parallel operation is performed, an arithmetic operation employing a digital filter coefficient of the low-frequency filter is unnecessary. The arithmetic operation only has to be performed for the high-frequency filter. Among output values of the high-frequency filter, values at the A3 timing and the A2 timing are stored in the filter-state storing unit corresponding to the low-frequency filter.

Figure 17:
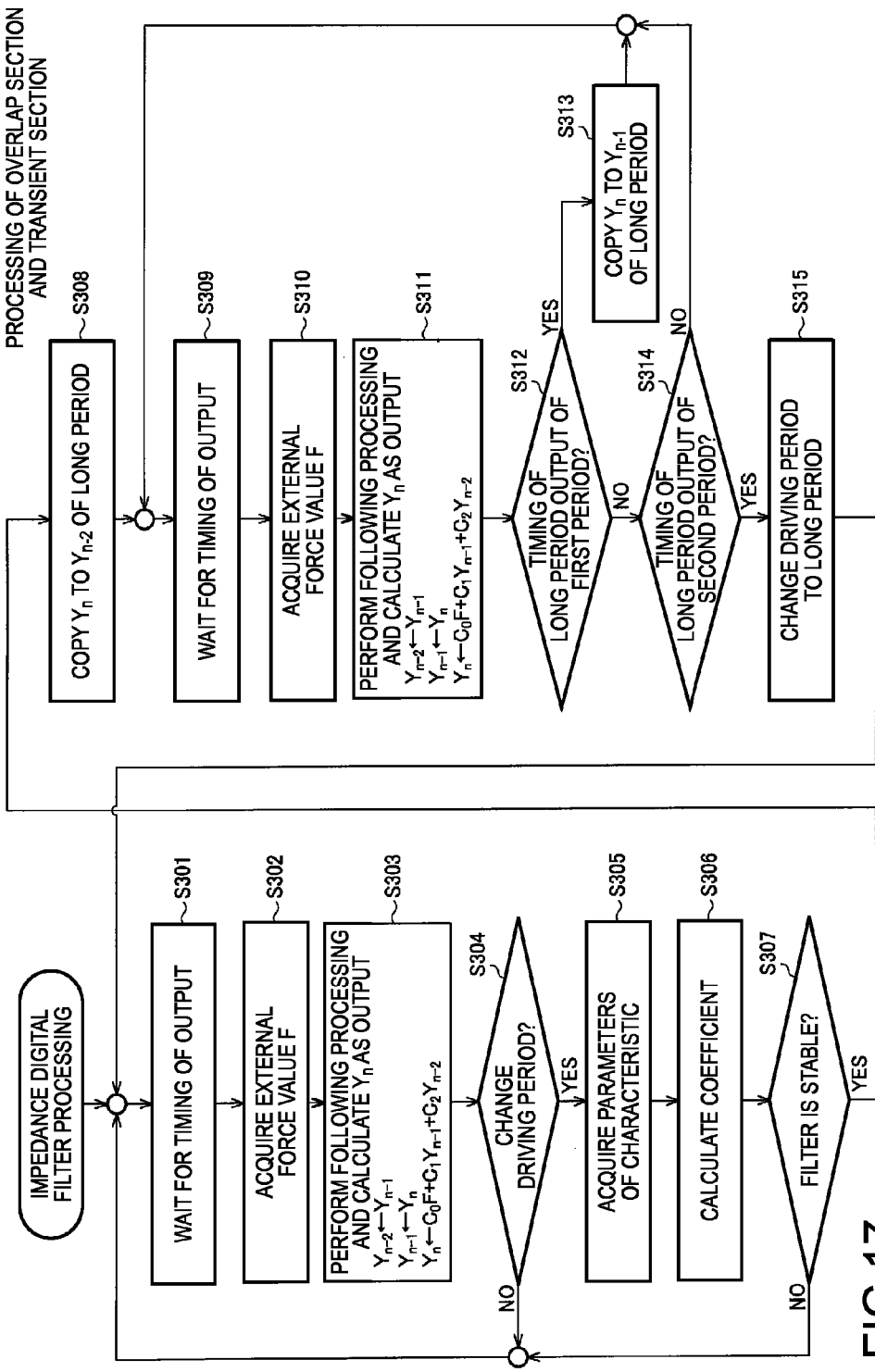
FIG. 17 is a flowchart for explaining the driving frequency switching processing from a high frequency to a low frequency.

A detailed processing example in this embodiment is explained with reference to a flowchart of FIG. 17. FIG. 17 is a flowchart concerning processing in the digital filter unit 22.

When this processing is started, first, after waiting for timing of output (S301), the digital filter unit 22 acquires the external force value F (S302). It is assumed that the external force value F is obtained by applying the correction processing by the input correcting unit 30 to sensor information acquired from the force sensor 10.

Subsequently, the digital filter unit 22 performs digital filter processing same as that in S103 of FIG. 12 (S303) and determines whether a driving period is changed (S304). In the case of No in S304, the digital filter unit 22 returns to S301 and continues the processing.

In the case of Yes in S304, the digital filter unit 22 acquires a digital filter coefficient after change and determines whether the filter is stable (S305 to S307). This processing is the same as the processing in S105 to S107 in FIG. 12.

In the case of Yes in S307, first, the digital filter unit 22 stores an output value at that timing as an output value at the second immediately preceding timing of the low-frequency filter. In FIG. 16, this corresponds to the A3 timing. Since actual switching is performed at the A1 timing, an output value at the A3 timing is an output value at two timings in the past from the time of the switching.

Processing in S309 to S311 is digital filter processing in the high-frequency filter as in S301 to S303. The digital filter unit 22 determines whether the present timing is output timing at a first period in the low-frequency filter (S312). In FIG. 16, this is determination whether the present timing is the timing of A2. An output value of the high-frequency filter at timing between A3 and A2 does not contribute to the operation of the low-frequency filter. Therefore, only when the present timing is the timing of A2 (Yes in S312), the digital filter unit 22 stores an output value at the timing of A2 as an output value at the immediately preceding timing of the low-frequency filter (S313). After the processing in S313, the digital filter unit 22 returns to S309.

In the case of No in S312, the digital filter unit 22 determines whether the present timing is output timing at the second period in the low-frequency filter (S314). In FIG. 16, this is determination whether the present timing is the timing of A1. In the case of No in S314, the digital filter unit 22 returns to S309. In the case of Yes in S314, the digital filter unit 22 switches the driving frequency to a low frequency (S315). Specifically, in S308 to S315, the digital filter unit 22 stores an output value at the timing of A3 (S308). Between A3 and A2, the digital filter unit 22 performs nothing (No in both S312 and S314). The digital filter unit 22 stores an output value at the timing of A2 (S313). Between A2 and A1, the digital filter unit 22 performs nothing (No in both S312 and S314). In that way, after storing the output values at A2 and A3, the digital filter unit 22 performs the switching of the driving frequency at the timing of A1 (S315).

4.2.2 Switching from a Low Frequency to a High Frequency

Figure 18:
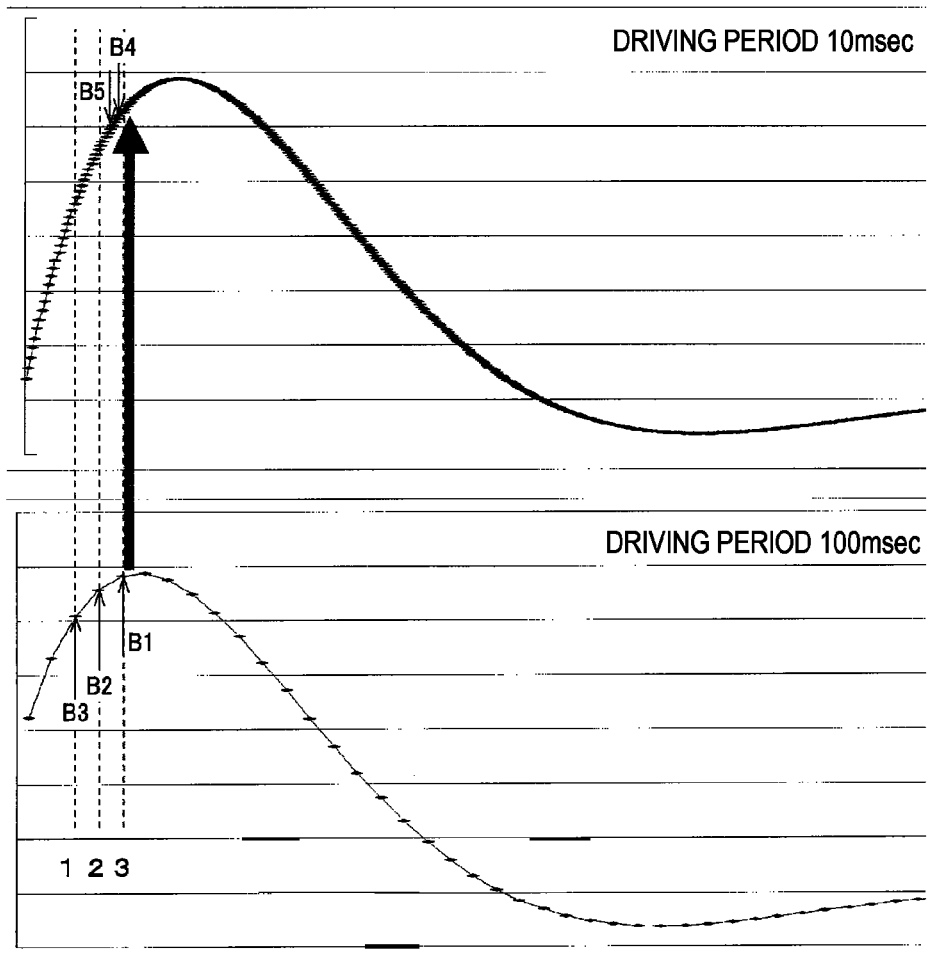
FIG. 18 is an explanatory diagram of driving frequency switching processing from a low frequency to a high frequency.

A switching from a low frequency (a long period) to a high frequency (a short period) is explained. It is considered that the driving frequency is switched at timing of B1 as shown in FIG. 18. When the driving frequency is switched, to calculate an output value in the high-frequency filter after the switching, output values in the high-frequency filter at two timings in the past indicated by B4 and B5 are necessary. On the other hand, outputs at timing in the past stored at the timing of B1 are outputs at timings indicated by B2 and B3.

Therefore, output values at two timings in the past necessary for the operation of the high-frequency filter are absent. Therefore, switching of the driving frequency cannot be performed in this state. In this embodiment, interpolation processing for estimating output values of the high-frequency filter at the timings of B4 and B5 is performed on the basis of output values of the low-frequency filter at the timing of B1 and the timing of B2. For example, the processing only has to be performed using Formula (3) below.

$$Y_{n-2} = Y_n - 2\frac{P_S}{P_L}(Y_n - Y_{n-1}) \quad (3)$$

$$Y_{n-1} = Y_n - \frac{P_S}{P_L}(Y_n - Y_{n-1})$$

In Formula (3), Y on the left side represents a value concerning the high-frequency filter. Y on the right side represents a value concerning the low-frequency filter. $P_S$ represents a driving period of the high-frequency filter and $P_L$ represents a driving period of the low-frequency filter. In other words, general linear interpolation is used. However, a method of the interpolation processing is not limited to this. For example, approximation by a quadratic function may be performed using an output value at the timing of B3 as well.

Figure 19:
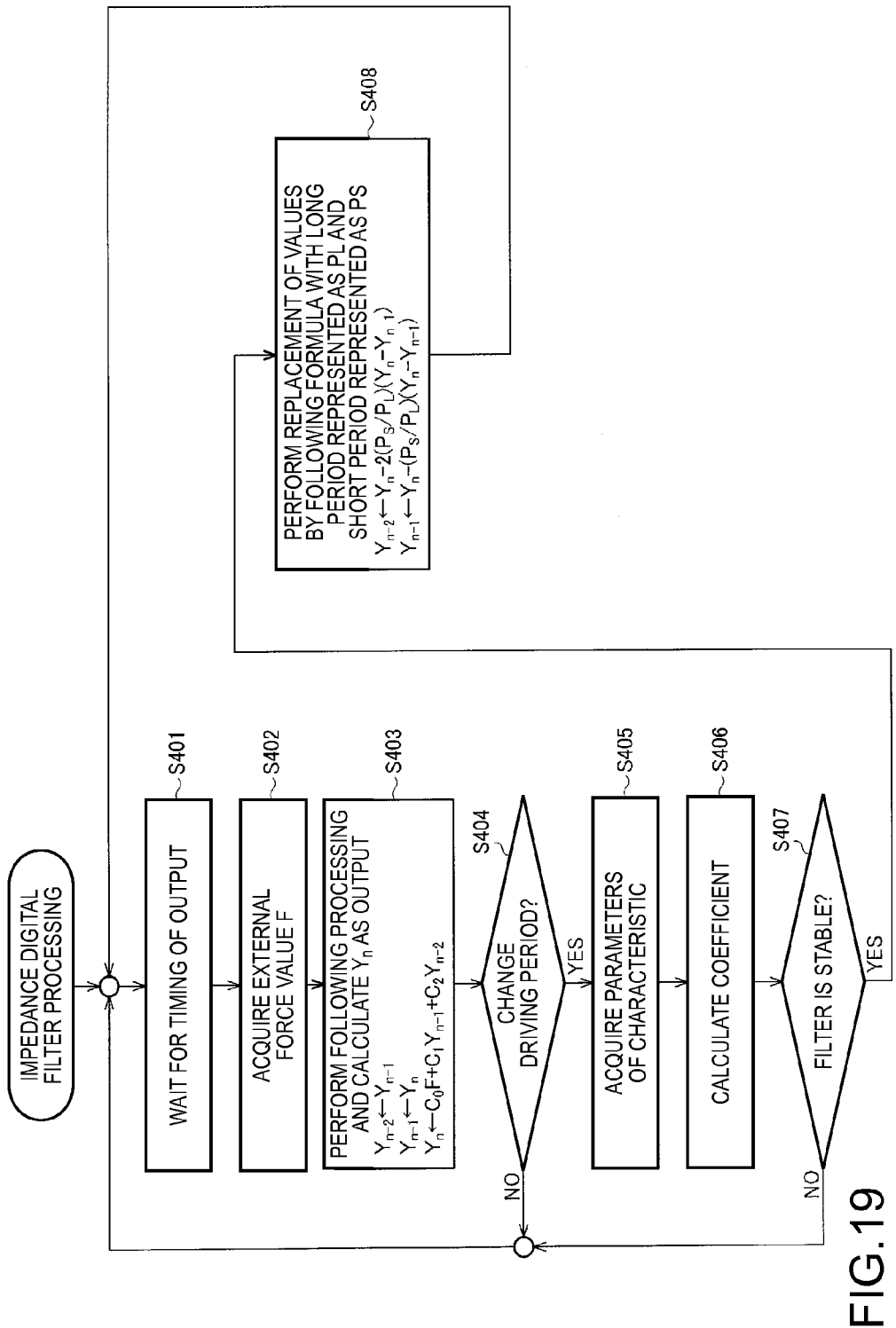
FIG. 19 is a flowchart for explaining the driving frequency switching processing from a low frequency to a high frequency.

A detailed processing example of this embodiment is explained with reference to a flowchart of FIG. 19. FIG. 19 is a flowchart concerning processing in the digital filter unit 22.

Since processing in S401 to S407 is the same as the processing in S301 to S307 in FIG. 17, detailed explanation of the processing is omitted. In the case of Yes in S407, i.e., when the switching of the driving frequency is instructed and it is determined that the digital filter after the switching is stable, the digital filter unit 22 calculates output values at two timings in the past in the high-frequency filter using Formula (3) (S408), returns to S401, and performs the digital filter processing by the high-frequency filter.

In this embodiment explained above, the digital-filter-coefficient output unit 222 includes, as shown in FIG. 15, the coefficient selecting unit 228 that selects any one of a first digital filter coefficient and a second digital filter coefficient different from the first digital filter coefficient. The digital-filter-coefficient output unit 222 outputs the digital filter coefficient selected by the coefficient selecting unit 228 to the digital filter arithmetic unit 221.

The digital-filter-coefficient storing unit that outputs the digital filter coefficient to the coefficient selecting unit 228 may include the two digital-filter-coefficient storing units (224-1 and 224-2) as shown in FIG. 15.

Consequently, by storing a plurality of digital filter coefficients in advance, selecting one digital filter coefficient out of the digital filter coefficients, and using the selected digital filter coefficient, even if only one digital filter arithmetic unit 221 is provided, it is possible to smoothly switch a plurality of digital filters. In order to smooth the switching, the filter-state storing unit 227 desirably store filter states corresponding to the plurality of digital filters in advance (e.g., as shown in FIG. 15, this can be realized if the filter-state storing unit 227 includes the plurality of filter-state storing units 227-1 and 227-2).

The digital filter processing may be performed at a driving frequency of any one of a first driving frequency and a second driving frequency (higher than the first driving frequency). In that case, the coefficient selecting unit 228 selects any one of a first digital filter coefficient corresponding to the first driving frequency and a second digital filter coefficient corresponding to the second driving frequency. The digital filter arithmetic unit 221 performs, using the selected digital filter coefficient, the digital filter processing at a driving frequency corresponding to the coefficient.

Consequently, it is possible to switch the driving frequency of the digital filter processing. An advantage of switching the driving frequency is as explained above.

The force control unit 20 may include, as shown in FIG. 10, the band limiting unit 24 that applies band limiting processing for allowing a given frequency band to pass to the sensor information and outputs the sensor information subjected to the band limiting processing to the digital filter arithmetic unit. The band limiting unit 24 outputs, when the first driving frequency is used, the sensor information subjected to band limiting processing for allowing a first frequency band to pass and outputs, when the second driving frequency is used, the sensor information subjected to band limiting processing for allowing a second frequency band (which is wider than the first frequency band) to pass.

The band limiting unit 24 may include, as shown in FIG. 15, the band limiting unit 24-1, the band limiting unit 24-2, and the input selecting unit 25. This is because, although a plurality of kinds of band limiting processing are applied to correspond to a plurality of driving frequencies, since only one digital filter arithmetic unit 221 is provided, it is necessary to select appropriate sensor information output sensor information after the plurality of kinds of band limiting processing. The band limiting unit 24 may be configured to execute only one kind of processing out of the plurality of kinds of band limiting processing and not to execute the other kinds of processing. Consequently, it is possible to apply the band limiting processing to the sensor information according to the driving frequency. Advantages of the band limiting processing are as explained in the second embodiment.

When the driving frequency of the digital filter processing is switched from the high second driving frequency to the low first driving frequency, the digital filter arithmetic unit 221 may switch the digital filter processing in the first period, the switching period, and the second period. The next period of the first period is the switching period and the next period of the switching period is the second period. In the first period, the digital filter arithmetic unit 221 performs the digital filter processing by the second driving frequency in which the second digital filter coefficient is used. In the switching period, the digital filter arithmetic unit 221 performs both of the digital filter processing by the first driving frequency in which the first digital filter coefficient is used and the digital filter processing by the second driving frequency in which the second digital filter coefficient is used. In the second period, the digital filter arithmetic unit 221 performs the digital filter processing by the first driving frequency in which the first digital filter coefficient is used.

Consequently, it is possible to perform smooth switching from a high frequency to a low frequency explained in detail with reference to FIGS. 16 and 17. In FIG. 16, the first period corresponds to a period before the timing of A3, the switching period corresponds to the period between A3 and A1, and the second period corresponds to the period after A1.

When the driving frequency of the digital filter processing is switched from the low first driving frequency to the high second driving frequency, the digital filter arithmetic unit 221 may perform, on the basis of a first output value, which is an output value of the first digital filter processing at switching timing, and a second output value, which is an output value of the first digital filter processing at timing in the past, interpolation processing for calculating an interpolation value at timing between the switching timing and the timing in the past.

In the above explanation, i-th (i=1 or 2) digital filter processing means digital filter processing by an i-th driving frequency in which an i-th digital filter coefficient is used. The switching timing means timing for switching the driving frequency and is equivalent to B1 in FIG. 18. The timing in the past means timing further in the past than the switching timing and is equivalent to B2 and B3 (in a narrow sense, sampling timing of the first digital filter processing). The interpolation value is a value calculated from the first output value and the second output value and is, in a narrow sense, a value corresponding to an output value of the digital filter processing at sampling timing of the second digital filter processing and timing immediately preceding and the second immediately preceding the switching timing (equivalent to B4 and B5). Consequently, it is possible to perform the smooth switching processing from a high frequency to a low frequency explained in detail with reference to FIGS. 18 and 19.

5. Fourth Embodiment

In the second and third embodiments, the switching of the driving frequency is performed on the basis of input information from a user via, for example, an external I/F. On the other hand, in a fourth embodiment, selection processing for an output filter (in a narrow sense, switching processing for a driving frequency) is performed on the basis of sensor information acquired from a force sensor.

Specifically, low-frequency sensor information obtained by applying low-pass filter processing to the sensor information and high-frequency sensor information obtained by applying high-pass filter processing to the sensor information are calculated. A ratio of high-frequency components to an entire signal is calculated from the low-frequency sensor information and the high-frequency sensor information. When the ratio of the high-frequency components is high, a digital filter having a high driving frequency is selected as an output filter. When the ratio of the high-frequency components is low, a digital filter having a low driving frequency is selected as the output filter.

5.1 Configuration

Figure 20:
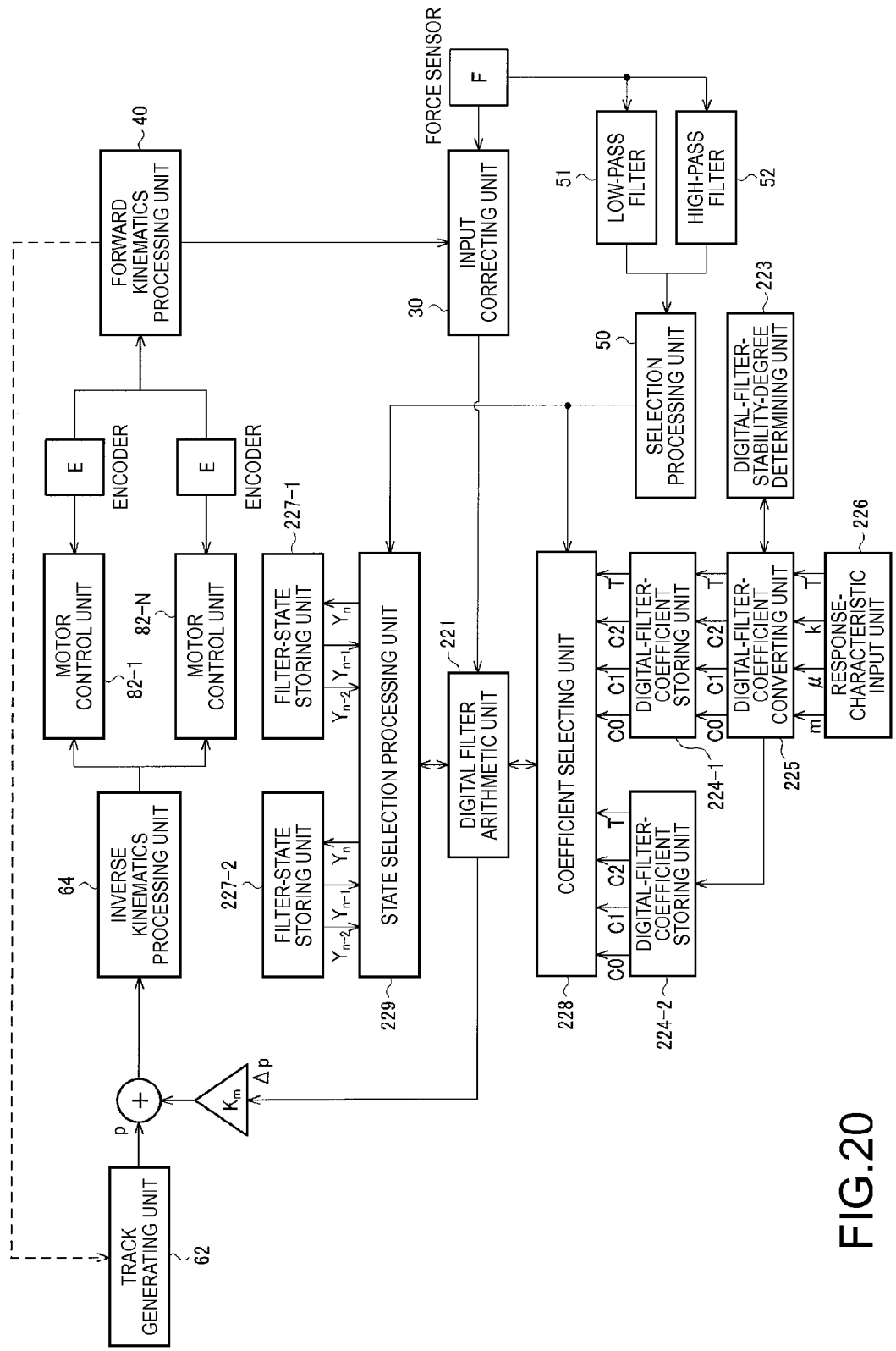
FIG. 20 is a configuration example of a robot control system and a robot system according to a fourth embodiment.

A configuration example of a robot system including a robot control system according to the fourth embodiment is shown in FIG. 20. Detailed explanation of components same as those in the third embodiment (FIG. 15) is omitted. When compared with the third embodiment, the fourth embodiment is different in that a selection processing unit 50, a low-pass filter 51, and a high-pass filter 52 are added. For simplification of explanation, the band limiting unit 24-1, the band limiting unit 24-2, and the input selecting unit 25 are not shown in the figure. However, in this embodiment, these units may be used. In that case, a processing result of the selection processing unit 50 is output to the input selecting unit 25 as well.

The low-pass filter 51 applies low-pass filter processing to sensor information acquired from the force sensor and outputs low-frequency sensor information. Similarly, the high-pass filter 52 applies high-pass filter processing to the sensor information acquired from the force sensor and outputs high-frequency sensor information.

The selection processing unit 50 calculates a ratio of high-frequency components to an entire signal on the basis of the low-frequency sensor information and the high-frequency sensor information. Further, the selection processing unit 50 performs, on the basis of the calculated ratio, processing for selecting a digital filter used as an output filter out of a plurality of digital filters. The selection processing unit 50 outputs a result of the selection processing to the coefficient selecting unit 228 and the state selection processing unit 229. The coefficient selecting unit 228 selects a digital filter coefficient corresponding to the selected output filter. The state selection processing unit 229 performs processing concerning a filter state corresponding to the selected output filter.

5.2 Detailed Processing

Details of the processing in this embodiment are the same as those shown in FIG. 17 or 19. The determination of the switching of the driving frequency in S304 or S404 is performed on the basis of whether the output filter selected by the selection processing unit 50 changes.

In the above explanation, as in the third embodiment, only one digital filter arithmetic unit is provided. However, the invention is not limited to this. For example, as in the second embodiment (FIG. 13), two digital filter arithmetic units may be provided. In that case, the selection processing unit 50, the low-pass filter 51, and the high-pass filter 52 are added to FIG. 13. A processing result of the selection processing unit 50 is output to the digital-filter-output selecting unit 220. The digital-filter-output selecting unit 220 selects, as an output of the digital filter unit 22, an output from a digital filter arithmetic unit corresponding to a digital filter selected by the selection processing unit 50.

In this embodiment explained above, the digital filter unit 22 includes, as shown in FIG. 20, the selection processing unit 50 that selects a driving frequency of a digital filter on the basis of signal frequency band information of sensor information. The digital filter unit 22 performs digital filter processing at the driving frequency selected by the selection processing unit 50 and outputs a correction value.

As the selection of the driving frequency, in a narrow sense, any one of a first driving frequency and a second driving frequency is selected. However, three or more candidate driving frequencies may be provided.

Consequently, a user can select a driving frequency without performing input or the like. Therefore, it is possible to provide a user-friendly system.

The selection processing unit 50 may use, as the signal frequency band information, low-frequency sensor information obtained by applying the low-pass filter 51 to sensor information and high-frequency sensor information obtained by applying the high-pass filter 52 to the sensor information. In other words, the selection processing unit 50 selects a driving frequency on the basis of the low-frequency sensor information and the high-frequency sensor information.

Consequently, it is possible to perform selection of a driving frequency through simple processing of filter processing. As a specific example of the processing, it is conceivable to calculate a ratio of high-frequency components to an entire signal from the low-frequency sensor information and the high-frequency sensor information. If there are a lot of high-frequency components, the driving frequency is set high to correspond to the high-frequency components of the signal. If there are only a few high-frequency components, the driving frequency may be low.

The first to fourth embodiments according to the invention and the modifications of the embodiments are explained above. However, the invention is not limited to the first to fourth embodiments and the modifications per se. At an implementation stage, the components can be modified and embodied without departing from the spirit of the invention. Various inventions can be formed by combining, as appropriate, the plurality of components disclosed in the first to fourth embodiments and the modifications. For example, several components may be deleted from all the components described in the first to fourth embodiments and the modifications. Further, the components explained in the different embodiments and the modifications may be combined as appropriate. A term described at least once together with a different term with a broader sense or the same meaning in the specification or the drawings can be replaced with the different term in any part of the specification or the drawings. In this way, various modifications and applications are possible without departing from the spirit of the invention.

What is claimed is:

1. A robot control system for controlling a robot having a sensor, the system comprising:
   a digital filter that outputs a correction value used for feedback control of the robot, wherein the digital filter includes
      a digital filter coefficient output unit that calculates and outputs a digital filter coefficient based on coefficient parameters of an ordinary differential equation associated with control of the robot, and
      a digital filter arithmetic unit that performs a digital filter process for controlling the robot based on the digital filter coefficient and data received from the sensor.

2. A robot control system according to claim 1 wherein the sensor is a force sensor.

3. A robot control system according to claim 1 further comprising:

a force control unit that includes the digital filter and performs force control of the robot using the correction value.

4. A robot control system according to claim 1 wherein the ordinary differential equation is an equation of motion having coefficient parameters corresponding to mass, viscosity, and elasticity.

5. A robot system comprising:
the robot control system according to claim 1; and
a robot.

6. A robot system comprising:
the robot control system according to claim 2; and
a robot.

7. A robot system comprising:
the robot control system according to claim 3; and
a robot.

8. A robot system comprising:
the robot control system according to claim 4; and
a robot.

9. A robot, comprising:
a sensor;
a digital filter that outputs a correction value used for feedback control of the robot, wherein the digital filter includes
a digital filter coefficient output unit that calculates and outputs a digital filter coefficient based on coefficient parameters of an ordinary differential equation associated with control of the robot, and
a digital filter arithmetic unit that performs a digital filter process for controlling the robot based on the digital filter coefficient and data received from the sensor.

* * * * *